(12) United States Patent
Niedermeier et al.

(10) Patent No.: US 11,862,184 B2
(45) Date of Patent: *Jan. 2, 2024

(54) APPARATUS AND METHOD FOR PROCESSING AN ENCODED AUDIO SIGNAL BY UPSAMPLING A CORE AUDIO SIGNAL TO UPSAMPLED SPECTRA WITH HIGHER FREQUENCIES AND SPECTRAL WIDTH

(71) Applicant: Fraunhofer-Gesellschaft zur Foerderung der angewandten Forschung e.V., Munich (DE)

(72) Inventors: Andreas Niedermeier, Munich (DE); Sascha Disch, Fuerth (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/407,008

(22) Filed: Aug. 19, 2021

(65) Prior Publication Data

US 2021/0383818 A1 Dec. 9, 2021

Related U.S. Application Data

(63) Continuation of application No. 16/008,323, filed on Jun. 14, 2018, now Pat. No. 11,100,939, which is a (Continued)

(30) Foreign Application Priority Data

Dec. 14, 2015 (EP) ..................................... 15199851

(51) Int. Cl.
*G10L 19/16* (2013.01)
*H04B 1/69* (2011.01)
(Continued)

(52) U.S. Cl.
CPC ............. *G10L 19/173* (2013.01); *G10L 19/02* (2013.01); *G10L 19/022* (2013.01); *G10L 19/24* (2013.01); *H04B 1/69* (2013.01)

(58) Field of Classification Search
CPC . H04L 27/2602; G10L 19/0204; G10L 19/18; G10L 19/022; G10L 19/173; G10L 19/24
(Continued)

(56) References Cited

U.S. PATENT DOCUMENTS 6,778,953 B1  8/2004  Edler et al.
7,996,233 B2  8/2011  Oshikiri
(Continued)

FOREIGN PATENT DOCUMENTS

CA    2 236 649   *  5/1999  ................ H04J 3/18
CA    2918524 A1      1/2015
(Continued)

OTHER PUBLICATIONS

Chakraborty, Debrupa, "Investigations into parametric audio coding side information", Master thesis von Debrupa Chakraborty aus Kolkata, Indien, 86 pp.
(Continued)

*Primary Examiner* — Farzad Kazeminezhad
(74) *Attorney, Agent, or Firm* — Perkins Coie LLP; Michael A. Glenn

(57) ABSTRACT

An apparatus for processing an encoded audio signal, which includes a sequence of access units, each access unit including a core signal with a first spectral width and parameters describing a spectrum above the first spectral width, has a demultiplexer generating, from an access unit of the encoded audio signal, the core signal and a set of the parameters, an upsampler upsampling the core signal of the access unit and outputting a first upsampled spectrum and a timely consecutive second upsampled spectrum, the first upsampled spec-
(Continued)

trum and the second upsampled spectrum, both, having a same content as the core signal and having a second spectral width being greater than the first spectral width of the core spectrum, a parameter converter converting parameters of the set of parameters of the access unit to obtain converted parameters, and a spectral gap filling processor processing the first upsampled spectrum and the second upsampled spectrum using the converted parameters.

29 Claims, 14 Drawing Sheets

Related U.S. Application Data continuation of application No. PCT/EP2016/080331, filed on Dec. 8, 2016.

(51) Int. Cl.
*G10L 19/02* (2013.01)
*G10L 19/24* (2013.01)
*G10L 19/022* (2013.01)

(58) Field of Classification Search
USPC ............... 704/219, 21.001, 207; 375/259
See application file for complete search history.

(56) References Cited

U.S. PATENT DOCUMENTS

| | | | |
|---|---|---|---|
| 8,639,735 B2 | 1/2014 | Benjelloun Touimi | |
| 8,874,450 B2 | 10/2014 | Peng et al. | |
| 9,020,815 B2 | 4/2015 | Gao | |
| 9,111,532 B2 | 8/2015 | Taleb et al. | |
| 10,236,007 B2 | 3/2019 | Disch et al. | |
| 2002/0077812 A1 | 6/2002 | Suzuki et al. | |
| 2003/0231714 A1* | 12/2003 | Kjeldsen ............ | H04L 27/2601 375/259 |
| 2005/0207502 A1 | 9/2005 | Ozawa | |
| 2008/0260048 A1 | 10/2008 | Oomen et al. | |
| 2009/0132261 A1 | 5/2009 | Kjorling et al. | |
| 2009/0198753 A1 | 8/2009 | Benjelloun | |
| 2010/0063802 A1 | 3/2010 | Gao | |
| 2010/0063808 A1 | 3/2010 | Gao et al. | |
| 2010/0332221 A1* | 12/2010 | Yamanashi ............ | G10L 19/18 704/E21.001 |
| 2011/0002266 A1 | 1/2011 | Gao | |
| 2011/0054885 A1 | 3/2011 | Nagel et al. | |
| 2011/0054911 A1 | 3/2011 | Baumgarte et al. | |
| 2013/0051571 A1 | 2/2013 | Nagel et al. | |
| 2013/0226570 A1* | 8/2013 | Multrus ............ | G10L 19/0204 704/219 |
| 2014/0207362 A1 | 7/2014 | Shimotani et al. | |
| 2014/0365231 A1 | 12/2014 | Hoerich et al. | |
| 2015/0162010 A1 | 6/2015 | Ishikawa et al. | |
| 2015/0243293 A1 | 8/2015 | Nagel et al. | |
| 2015/0287417 A1 | 10/2015 | Disch et al. | |
| 2016/0111103 A1 | 4/2016 | Nagisetty et al. | |

FOREIGN PATENT DOCUMENTS

| | | |
|---|---|---|
| CN | 1918634 A | 2/2007 |
| CN | 101069233 A | 11/2007 |
| CN | 101086845 A | 12/2007 |
| CN | 101933087 A | 12/2010 |
| CN | 102246231 A | 11/2011 |
| CN | 102598121 A | 7/2012 |
| CN | 103366750 A | 10/2013 |
| CN | 103403799 A | 11/2013 |
| CN | 104769671 A | 7/2015 |
| EP | 1875464 B1 | 12/2012 |
| EP | 2830054 A1 | 1/2015 |
| JP | 2007524124 A | 8/2007 |
| RU | 2520402 C2 | 6/2014 |
| WO | 9857436 A2 | 12/1998 |
| WO | 2007037361 A1 | 4/2007 |
| WO | 2011062536 A1 | 5/2011 |
| WO | 2014128197 A1 | 8/2014 |
| WO | 2014199632 A1 | 12/2014 |
| WO | 2014207362 A1 | 12/2014 |
| WO | 2015010948 A1 | 1/2015 |

OTHER PUBLICATIONS

ISO/IEC MPEG, N1474, "Information technology—High efficiency coding and media delivery in heterogeneous environments—Part 3: 3D audio", Text of ISO/MPEG 23008-3 DIS on 3D AudioJTC1/SC29/WG11, 438 pp.

ITU-T, "Frame error robust narrow-band and wideband embedded variable bit-rate coding of speech and audio from 8-32 kbit/s", ITU-T Recommendation. G. 718. Jun. 2008, Jun. 2008, 257 pp.

Neuendorf, Max, et al., "The ISO/MPEG Unified Speech and Audio Coding Standard Consistent High Quality for all Content Types and at all Bit Rates", J. Audio Eng. Soc., vol. 61, No. 12, pp. 956-977.

Rothacher, Fritz Markus, "Part 1 of 2 Sample-Rate Conversion: Algorithms and VLSI Implementation", Hartung-Gorre Verlag, 1995, 1995, pp. 1-92.

Rothacher, Fritz Markus, "Part 2 of 2 Sample-Rate Conversion: Algorithms and VLSI Implementation", Hartung-Gorre Verlag, 1995, 1995, pp. 93-151.

Helmrich, Christian R, et al., "Low-complexity semi-parametric joint-stereo audio transform coding", 23rd European Signal Processing Conference, Sep. 4, 2015, 2015, 6 pages.

* cited by examiner

APPARATUS AND METHOD FOR PROCESSING AN ENCODED AUDIO SIGNAL BY UPSAMPLING A CORE AUDIO SIGNAL TO UPSAMPLED SPECTRA WITH HIGHER FREQUENCIES AND SPECTRAL WIDTH

CROSS-REFERENCES TO RELATED APPLICATIONS

This application is a continuation of U.S. patent application Ser. No. 16/008,323 filed Jun. 14, 2018, which is a continuation of International Application No. PCT/EP2016/080331, filed Dec. 8, 2016, which is incorporated herein by reference in its entirety, and additionally claims priority from European Application No. 15199851.5, filed Dec. 14, 2015, which is incorporated herein by reference in its entirety.

BACKGROUND OF THE INVENTION

The present invention relates to an apparatus for processing an encoded audio signal and a corresponding method.

Perceptual audio coding is the technique of digital representation of sound in a perceptually adapted way to allow for efficient storage, processing, transmission and reproduction. An essential tool to further reduce bit consumption is a semi-parametric method called bandwidth extension (BWE). This technique extends a perceptually encoded signal that is bandlimited to the lower frequency bands (LF) by adding a parameter controlled estimate of the missing high frequency bands (HF). Often, this is accomplished by transposition of the LF spectrum and subsequent energy envelope adjustment. Usually, a few perceptually relevant parameters are adjusted alongside (noise level, tonality, etc.).

Spectral Band Replication (SBR) and Intelligent Gap Filling (IGF) are contemporary technologies that provide bandwidth extension functionality. IGF (compare WO 2015/010948 A1) offers high coding efficiency and at the same time low computational complexity at a perceptual quality comparable to SBR (compare WO 98/57436 A2).

The estimation of the spectral envelopes in the high frequency bands in SBR and IGF is performed using filter banks of QMF (Quadrature Mirror Filter) and MCLT (Modulated Complex Lapped Transform) respectively.

This makes updating existing SBR-encoded audio material into an IGF-based representation an attractive task. A straightforward but cumbersome approach is a tandem coding including decoding SBR-based content into a pulse code modulation (PCM) time domain signal and subsequently re-encoding this signal to an IGF-based format.

SUMMARY

An embodiment may have an apparatus for processing an encoded audio signal, said encoded audio signal having a sequence of access units, each access unit having a core signal with a first spectral width and parameters describing a spectrum above the first spectral width, said apparatus having: a demultiplexer for generating, from an access unit of the encoded audio signal, said core signal and a set of said parameters, an upsampler for upsampling said core signal of said access unit and outputting a first upsampled spectrum and a timely consecutive second upsampled spectrum, the first upsampled spectrum and the secand upsampled spectrum, both, having a same content as the core signal and having a second spectral width being greater than the first spectral width of the core spectrum, a parameter converter for converting parameters of said set of parameters of said access unit to obtain converted parameters being applicable to the first upsampled spectrum and the second upsampled spectrum, and a spectral gap filling processor for processing said first upsampled spectrum and said second upsampled spectrum using said converted parameters.

Another embodiment may have a method for processing an encoded audio signal, said encoded audio signal having a sequence of access units, each access unit having a core signal with a first spectral width and parameters describing a spectrum above the first spectral width, said method having: generating, from an access unit of the encoded audio signal, said core signal and a set of said parameters, upsampling said core signal of said access unit and outputting a first upsampled spectrum and a timely consecutive second upsampled spectrum, the first upsampled spectrum and the second upsampled spectrum, both, having a same content as the core signal and having a second spectral width being greater than the first spectral width of the core spectrum, converting parameters of said set of parameters of said access unit to obtain converted parameters being applicable to the first upsampled spectrum and the second upsampled spectrum, and processing said first upsampled spectrum and said second upsampled spectrum using said converted parameters.

The encoded audio signal that is going to be processed via the inventive apparatus or by the inventive method comprises a sequence of access units. Each access unit comprises a core signal with a first spectral width and parameters describing a spectrum above the first spectral width.

The inventive apparatus for processing such an encoded audio signal comprises:

A demultiplexer for generating, from an access unit of the encoded audio signal, said core signal and a set of said parameters. In other words: the demultiplexer extracts from the access units of the encoded audio signal the core signal and the parameters which allow to reconstruct the missing spectrum above the spectrum corresponding to the core signal.

An upsampler for upsampling said core signal of said access unit and outputting a first upsampled spectrum and a timely consecutive second upsampled spectrum. The first upsampled spectrum and the second upsampled spectrum, both, having a same content as the core signal and having a second spectral width being greater than the first spectral width of the core spectrum. With other words: the upsampler upsamples the core signal and outputs at least two upsampled spectra. The upsampled spectra are timely consecutive, cover the same information as the core signal and have a spectra width greater than the spectral width of the core signal.

A parameter converter for converting parameters of said set of parameters of said access unit to obtain converted parameters. With other words: the parameter within the encoded audio signal are converted into parameter which can be applied to the upsampled spectra.

A spectral gap filling processor for processing said first upsampled spectrum and said second upsampled spectrum using said converted parameters. With other words: the spectral gap filling processor combines the upsampled spectra and the converted parameter. The result can be—depending on the embodiment—a transcoded audio signal being an encoded audio signal but with a different technique than the original or input encoded audio signal or the result can be an audio signal.

In one embodiment the upsampler is configured to fill an upper part of a spectrum of said core signal with zeroes and to derive the first upsampled spectrum and the second upsampled spectrum from the filled-up spectrum of the core signal.

In an embodiment, the upsampling is done based on at least two access units of the encoded audio signal. In this embodiment, the upsampler is configured for upsampling said core signal of said access unit additionally using a core signal of an access unit directly preceding said access unit. Hence, the information of two access units is needed and used to obtain the upsampled spectra.

In a further embodiment, the upsampler is configured for collecting core signals of a first number of timely consecutive access units and processing from these core signals a second number of upsampled spectra for a non-integer upsampling ratio, wherein the first number is a denominator of the ratio and the second number is a nominator of the ratio.

According to an embodiment, the parameter converter is configured for converting a first subset of parameters of said set of parameters referring to a first part of timely consecutive timeslots and for converting a second subset of parameters of said set of parameters referring to a second part of said timeslots timely consecutive to said first part of timeslots. Further, the spectral gap filling processor is configured to process a first converted subset of parameters with the first upsampled spectrum and to process a second converted subset of parameters with the second upsampled spectrum. In this embodiment, the parameter of the encoded audio signal refer to time slots, advantageously belonging to a frame.

In an embodiment, the converter is configured for converting parameters referring to energy values of said set of parameters into energy values usable by the spectral gap filling processor by scaling these parameter values with a given scale factor.

In one embodiment, the scale factor has a constant value.

In one embodiment the scale factor is adapted to the requirements of the given encoded audio signal. Therefore, the converter is configured for extracting an information about a window function associated with the access unit. Further, the converter is configured to adapt the scale factor according to the window function.

For a synchronization, in one embodiment, the converter is configured for shifting parameters of said set of parameters by inserting a delay compensation.

For the example of a MCLT and an QMF transform, the delay mismatch can be considers as follows. This under the assumption that MCLT energy is defined using the Long block (LB) window. To compare energies between the transforms, the windows has to be be synchronously placed on the data such that the center of gravity (CG) of the respective prototype windows are aligned. The weighing coefficient is unity at the CG.

The prototype window used for QMF analysis may be a low-pass FIR filter. The coefficients of the window are optimized for best sideband suppression, resulting advantageously in a symmetric window with a smooth roll-off at the window edges promising adequate sideband attenuation. The length of the window may be 640 with a hop size of the window stride being 64 sample long.

For an implementation of MCLT of a symmetric sine window may be used. The window, e.g., has a length of 2048 samples for long blocks while the short blocks have a length of 256 samples. It is one-eighth the size of long blocks. The hop size of the window stride is 1024 and 128 samples for long and short blocks respectively, which is equal to the frequency resolution of the transforms.

For example, the MCLT prototype windows used in IGF span over a length of 2 N=2048 samples and have an overlap of 50%. The short windows in the center of the short block have a length of N/4 and offsets of 448 samples on either sides. Thus, its hop size of N samples captures the first input samples while the delay $\tau 1$ consists of 1024 samples.

A QMF prototype window may span over the length of 10M=640 samples and having a hop size of M samples, called a sub-sample. The hop size also corresponds to the number of subbands in a QMF sub-sample, M. The delay compensation $\tau 2$ may be calculated as (window length—window hop size=640-64 samples) and is of 576 samples.

According to an embodiment, the upsampler is configured for upsampling said core signal by interpolating values of said core signal.

In an embodiment, the upsampler is configured as follows:

The upsampler is configured to fill up a spectrum of the core signal of the preceding access unit with zeros.

The upsampler is configured to fill up a spectrum of the core signal of the access unit with zeros.

The upsampler is configured to perform an inverse transform of the filled up spectrum of the access unit and of the filled up spectrum of the preceding access unit.

Finally, the upsampler is configured to perform an overlap-add of a time domain signal for the filled up spectrum of the preceding access unit and of a time domain signal for the filled up spectrum of the access unit, to obtain an intermediate time signal.

Based on the foregoing embodiment, according to an embodiment, the upsampler is configured to perform a forward transform with a first portion of the intermediate time signal to obtain the first upsampled spectrum. The upsampler is configured to perform a forward transform with a second portion of the intermediate time signal to obtain the second upsampled spectrum, too. This is done under the constriction that the first portion overlaps with the second portion.

According to an embodiment the upsampler is configured for upsampling said core signal in order to obtain an upsampled core signal, the upsampler is configured for performing an inverse transform on said upsampled core signal in order to obtain a time domain signal, and the upsampler is configured for processing said time domain signal to obtain said first upsampled spectrum and said timely consecutive second upsampled spectrum by applying a transform. Wherein the inverse transform is an inverse transform of the transform.

In one embodiment relating to the foregoing embodiment the inverse transform is an inverse modified discrete cosine transform and the transform is a modified discrete cosine transform.

In one embodiment the spectral gap filling processor is configured to process the first upsampled spectrum and the second upsampled spectrum with the converted parameters to obtain a time domain output signal.

In a following embodiment the spectral gap filling processor is configured to apply a first part of the converted parameters to the first upsampled spectrum to obtain a first processed spectrum and to apply a second part of the converted parameters to the second upsampled spectrum to obtain a second processed spectrum.

According to an embodiment, the spectral gap filling processor is configured for comprising an spectrum converter for converting the first processed spectrum and the second processed spectrum into a time domain, and the spectral gap filling processor is configured for comprising an audio adder being configured for overlap-adding at least two output time signals in order to obtain an audio signal.

In an embodiment, the spectral gap filling processor is configured for generating a spectral gap filling coded signal having a first access unit and a second access unit, the first access unit comprising a transformed version of the first upsampled spectrum and a first part of the converted parameter and the second access unit comprising a transformed version of the second upsampled spectrum and a second part of the converted parameter.

According to an embodiment the spectral gap filling processor is configured for generating an output data stream having a first access unit and a second access unit. This data stream is, for example, an IGF-encoded audio signal being a transcoded audio signal.

In one embodiment, the spectral gap filling processor is configured for processing said first upsampled spectrum and said second upsampled spectrum with said converted parameters to obtain two transcoded access unit, and the spectral gap filling processor is configured for adding said two transcoded access units to obtain a transcoded audio signal.

In the case that the apparatus works as a transcoder and, thus, outputs a transcoded audio signal, then according to one embodiment the transcoded audio signal is an IGF-encoded audio signal.

According to an embodiment the encoded audio signal is a SBR-encoded audio signal.

The invention also refers to a method for processing an encoded audio signal. The encoded audio signal comprises a sequence of access units, each access unit comprising a core signal with a first spectral width and parameters describing a spectrum above the first spectral width.

The inventive method comprises at least the following steps:
  Generating, from an access unit—this access unit may be called current access unit—of the encoded audio signal, said core signal and a set of said parameters.
  Upsampling said core signal of said access unit and outputting a first upsampled spectrum and a timely consecutive second upsampled spectrum. The first upsampled spectrum and the second upsampled spectrum, both, having a same content as the core signal and having a second spectral width being greater than the first spectral width of the core spectrum.
  Converting parameters of said set of parameters of said access unit to obtain converted parameters.
  Processing said first upsampled spectrum and said second upsampled spectrum using said converted parameters.

The above mentioned embodiments of the apparatus can also be performed by steps of the method and corresponding embodiments of the method.

In one embodiment the processing of the encoded audio signal relates to a decoding of the encoded audio signal for generating an audio signal. In a different embodiment, the processing of the encoded audio signal is a direct transcoding the encoded audio signal into a differently encoded or transcoded audio signal. The transcoder, thus, generates from the—first—encoded audio signal with a first encoding method a—second—encoded audio signal based on a second different kind of encoding.

The encoded audio signal comprises a core signal and a parameter describing the missing parts of the original audio signal above the core signal. The parameter comprise e.g. a spectral envelope given in frames with a given number of timeslots and corresponding energy values or energies. For the parameters different filter banks can be used.

Benefits of the invention are a high precision in parameter mapping, a minimization of additional transcoding artefacts and a reduced computational complexity.

BRIEF DESCRIPTION OF THE DRAWINGS

Embodiments of the present invention will be detailed subsequently referring to the appended drawings, in which.

DETAILED DESCRIPTION OF THE INVENTION

In the following the encoded audio signal is as an example of a SBR-encoded audio signal but the invention is not limited on encoded audio signals based of this kind. This also holds for the kind of encoded audio signal in which the SBR-encoded audio signal is transcoded or which kind of corresponding signals or spectra are processed in any intermediate step. Here, this is as an example of many possibilities an IGF-encoded audio signal.

To transcode SBR data into an IGF representation, at least some of the following steps are done:
  Replace SBR copy-up content by IGF compliant copy-up material.
  Insertion of a delay compensation of QMF with respect to MDCT for data synchronization.
  Mapping of spectral high band envelope derived by SBR (through QMF based energy measurement) onto a MCLT representation.
  Mapping the underlying SBR time-frequency-grid on that of IGF: the mapping function is adapted according to the different types of windowing schemes, to derive MCLT energies from QMF energies.

Advantageously, application of an energy correction factor to eliminate any bias and minimize residual error.

Advantageously, translation of remaining SBR sideinfo (e.g. noisefloor, tonality aka. inverse filtering level, etc.) into suitable IGF parameters: e.g. inverse filtering level in SBR is mapped to a suitable whitening level in IGF to provide optimal perceptual quality.

Figure 1:
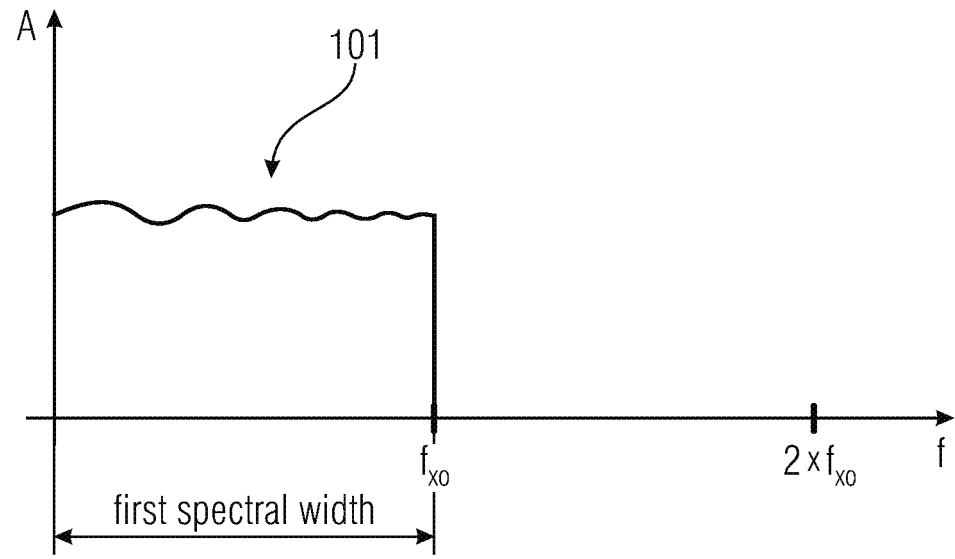
FIG. 1 illustrates a core signal of an encoded audio signal.

FIG. 1 shows the core signal 101 of an access unit of the encoded audio signal having a limited first spectral width reaching here from zero to a frequency $f_{xo}$. The parameters of the encoded audio signal describe the spectrum above this core signal 101 reaching here to the frequency $2*f_{xo}$.

Figure 2:
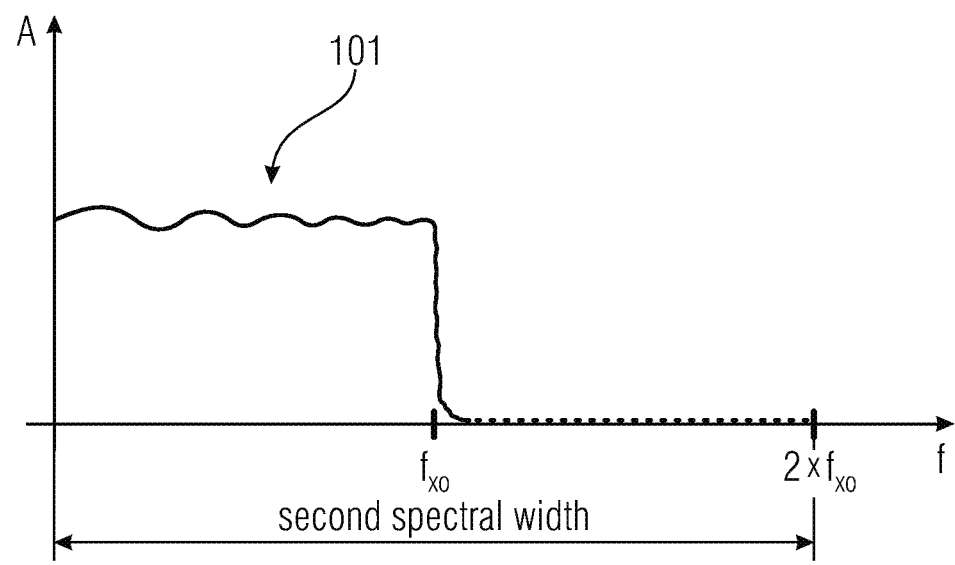
FIG. 2 illustrates an spectrum arising during the application of the invention.

This has to be compared with the spectrum shown in FIG. 2. Here, an upsampled spectra 1 comprises the same information content as the core signal of FIG. 1 and carry for the frequencies above this core signal zero values. The second spectral width reaches in this example from zero to the frequency of $2*f_{xo}$.

For transcoding of SBR data into an IGF representation, one has to map QMF energies to MCLT energy values.

This is described in detail in the following starting with a comparison of the QMF and MOLT transform:

Let x be a discrete audio signal sampled with a sample rate SR. If a QMF transform is applied to the signal x, one obtains $$X_{QMF}[l,k] = \text{QMF}(x,t) \in \mathbb{C}$$

where t is the start sample of the transformation, l is the timeslot index and k=0, 1, ..., m--1 is a frequency line up to m, the Nyquist frequency line.

If a windowed MCLT transform is applied to the signal x the result is $$X_{MCLT}[b,i] = \text{MDCR}(x,b) \in \mathbb{C}$$

where b is the startblock of the transformation and i=0, 1, ..., N-1 are the frequency lines up to the Nyquist frequency line N.

Exemplary parameters also used in the following discussion:

With the QMF transform a prototype length of 640 samples with a hopsize of 64 samples is used. This results in m=64 for the Nyquist frequency line.

If, for example, for the MCLT a long window size of 2048 with 50% overlap is used, hopsize is 1024 and therefore is N=1024 for the Nyquist frequency line. The overlapping windowing, generally, eliminates blocking artifacts.

Figure 3:
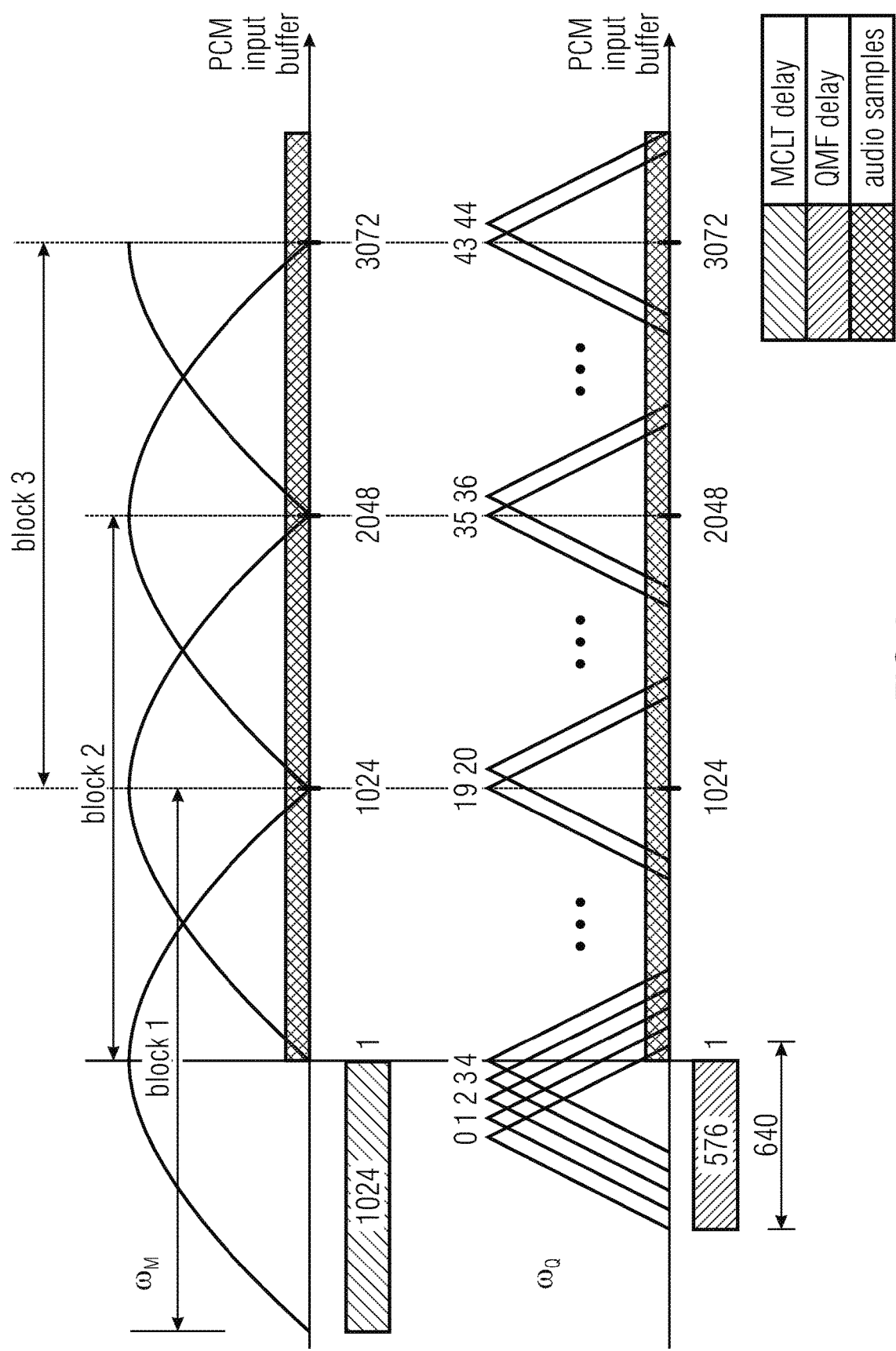
FIG. 3 illustrates a comparison of two transformations of an audio signal using QMF (Quadrature Mirror Filter, upper row) and MCLT (Modulated Complex Lapped Transform, lower row)

During analysis with such an exemplary configuration 32 QMF timeslots are needed to cover the same amount of samples as the MCLT transform, see FIG. 3. This FIG. 3 also illustrates the data synchronization where the sub-samples of QMF are aligned with the longer window of MOLT.

Figure 4:
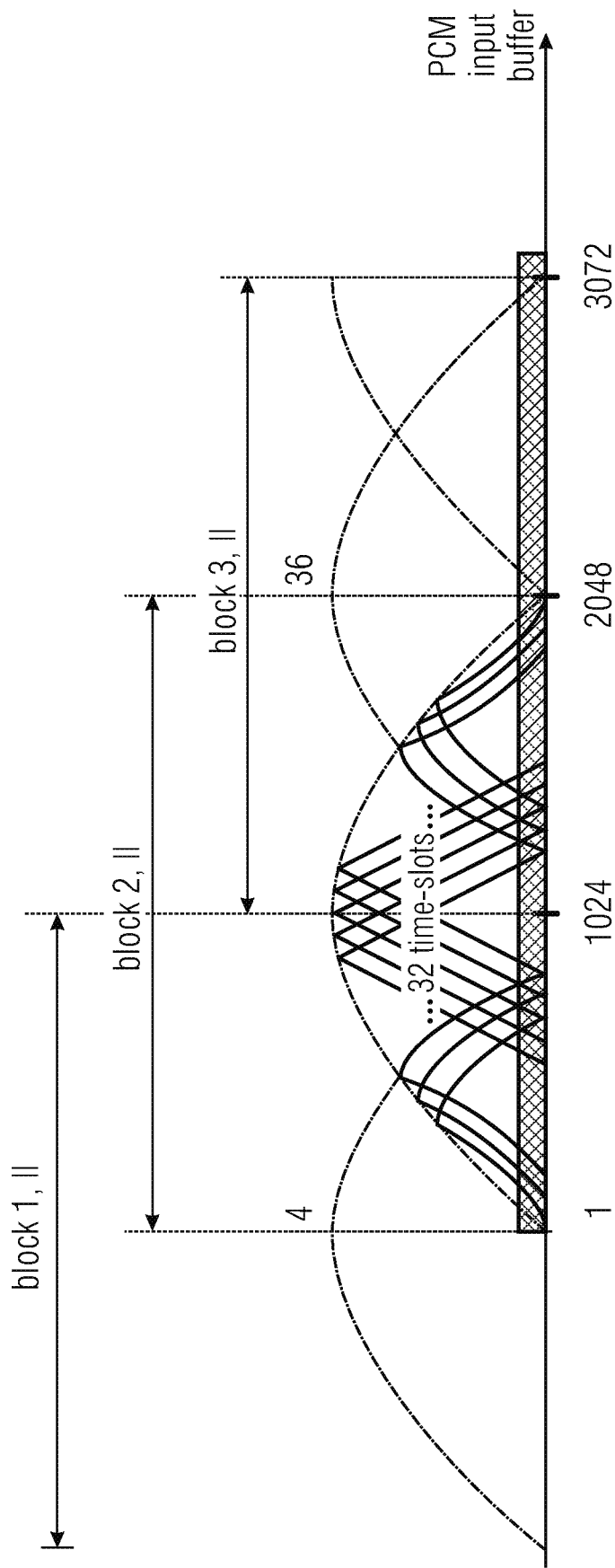
FIG. 4 illustrates the windowing of temporally consecutive QMF values by MOLT.

To prepare the QMF energies of the SBR-encoded audio signal for mapping, a window w is applied to temporally consecutive QMF values such as the time domain samples are windowed in the MOLT. This QMF windowing is shown in FIG. 4.

To map QMF energies properly to MCLT energies, both transforms need to be delay aligned.

Then, for the conversion of the QMF and MCLT energies the following formula hold:

$$E_{MCLT}[b] = \sum_{i=16x_0}^{N-1} X_{MCLT}[b,i]^2$$

$$E_{QMF}[b] = \sum_{l=l_0}^{l_0+31} w[l-l_0] \sum_{k=x_0}^{m-1} X_{QMF}[l,k]^2, l = 16b$$

where $x_o$ is the SBR cross-over frequency.

The next step is to convert the respective energy values from the QMF transform to the MCLT transform.

SBR frames help to define signal features using the granularity of temporal/spectral envelopes. The mapping of spectral envelopes has been investigated as part of mapping technique definition. The information imparted by the temporal resolution of the adaptive SBR grids is translated to the techniques of temporal adaptation in IGF.

A time domain signal analyzed with QMF filterbank has a time resolution of a sub-sample. The highest temporal resolution of SBR energies is over a time-slot, i.e. two sub-samples. The tradeoff between time and frequency resolution can be realized from the combination of time-slots and the choice of sub-band grouping. The different types of frames allow a variable number of time/frequency segments in a frame. As such, the signal characteristics are preserved by the envelopes which are quantized in grids.

The adaptive resolution of time/frequency in IGF can be realized using the different types of MCLT windows. As experiments have shown, the energies of a QMF sub-band can be collected in accordance to the MCLT block in comparison. This motivates incorporation of block switching during the energy mapping. The energies thus collected into sub-bands can be interpolated over the MCLT frequency bins. Thereafter, the IGF side information can be derived for envelope shaping during the source spectrum transposition.

Based on experiments, the QMF block energy can be calculated over 32 overlapping subsamples in a long block. To reduce the error of mapping to MCLT block energy, QMF involves an application of weighing coefficients of the MCLT prototype window. It is expected that by choice of an appropriate MCLT window helps in conservation of the signal features defined by the temporal envelopes of QMF.

These calculations are advantageously performed offline and before the usage of the apparatus or the method.

Figure 5:
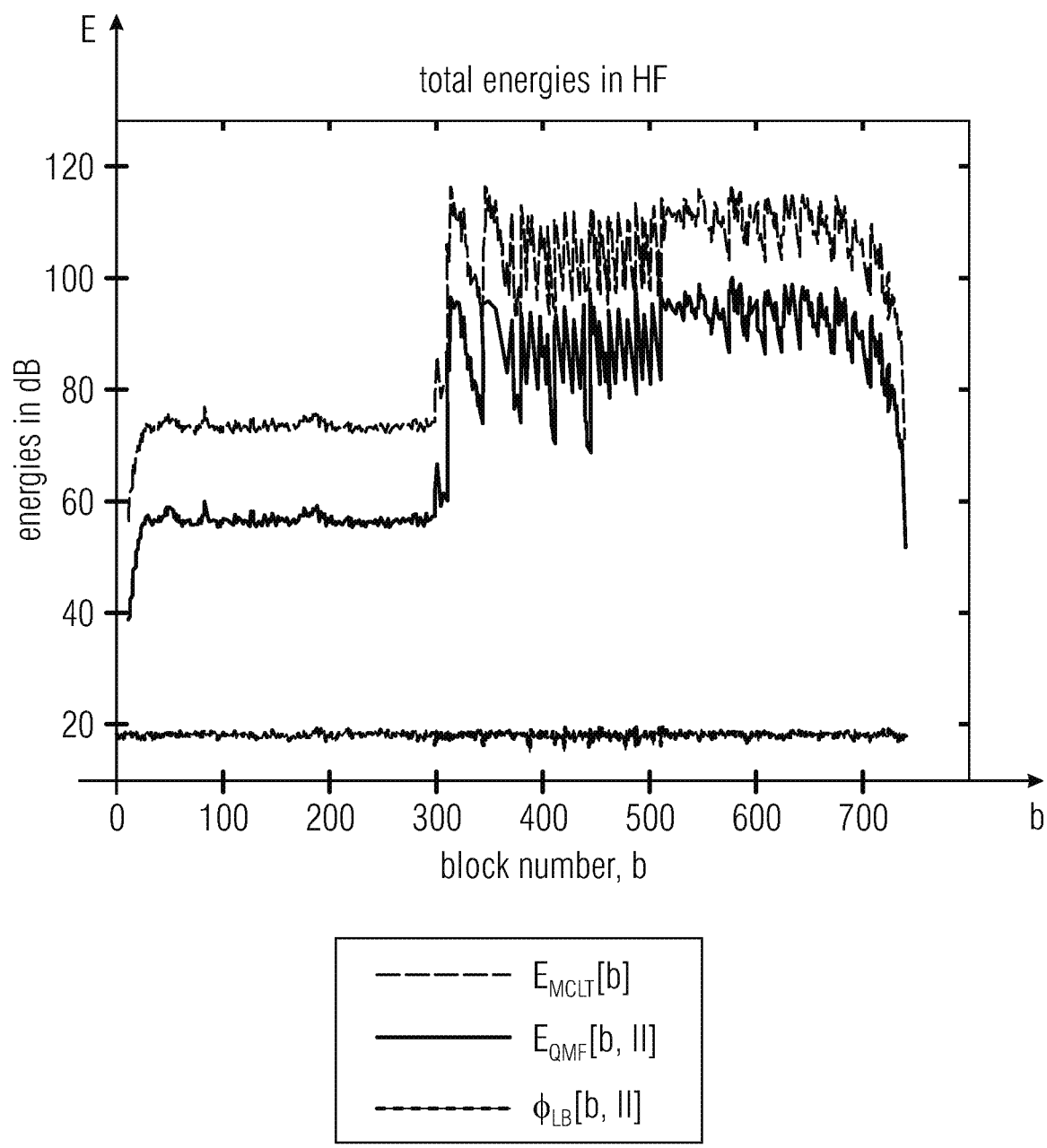
FIG. 5 illustrates the logarithmic energy values of the MCLT and QMF, respectively and the mean offset.

FIG. 5 shows the result of an example measurement in which the logarithmic energies of $E_{QMF}$ and EMDCT were compared (E'(QMF) and E'(MCLT)). This allows to calculate in the logarithmic domain:

$$E'(\text{QMF}) + \phi_{LB} \approx E'(\text{MCLT}), b = 1, 2, \ldots B.$$

This proofs the conversion of the energy values by using a constant scale factor s for the, thus, linear mapping in the linear domain:

$$s\, E_{QMF}[b] \approx E_{MCLT}[b], b = 1, 2, \ldots, B$$

where the scale factor s is given by:

$$S = 10^{\left(\frac{\phi_{LB}}{10}\right)}$$

and B is the total number of blocks which were measured. The mean offset $\phi_{LB}$ in one embodiment for all blocks by clipping all outliers to a 10% confidence interval:

$$\phi_{LB} = \frac{1}{B} \sum_{b=1}^{B} \text{clip}_{10}(\phi_{LB}[b])$$

$$= \frac{1}{B}\sum_{b=1}^{B} \text{clip}_{10}\left(10\log_{10}\left(\frac{E_{MCLT}[b]}{E_{QMF}[b]}\right)\right)$$

This confidence interval allows to clip data samples with an excessive deviation from the mean.

Exemplary measurement have shown a bias-free and precise match of energies with approx. 1 dB peak error. Utilizing this mapping, it is possible to convert SBR energy values transmitted in a bitstream containing a SBR-encoded audio signal into corresponding IGF energy values. The constant scale factor in the shown example is less than 20 and about 18 in log domain. These can be fed directly into an IGF decoder, or, alternatively, can be assembled into an IGF output bitstream.

Experiments have shown, that the mean offset $\phi_{LB}$ in the log domain has a value lower than 20. It was found that the mean offset $\phi_{LB}$ lies between 16 and 17 or in one case has a value of about 7. So, the mean offset $\phi_{LB}$ has values between 7 and 17.

Further experiments have shown that the mean offset $\phi_{LB}$ depends on the type of windows used. Obtained values are shown in the following table:

| Window type, notation | $\phi$ | std_$\phi$ |
|---|---|---|
| long blocks, LB | 16.0236 | 0.8785 |
| short blocks, SB | 7.2606 | 0.5661 |
| long start, Lstart | 16.5683 | 0.5578 |
| long stop, Lstop | 16.5769 | 1.1006 |

Figure 6:
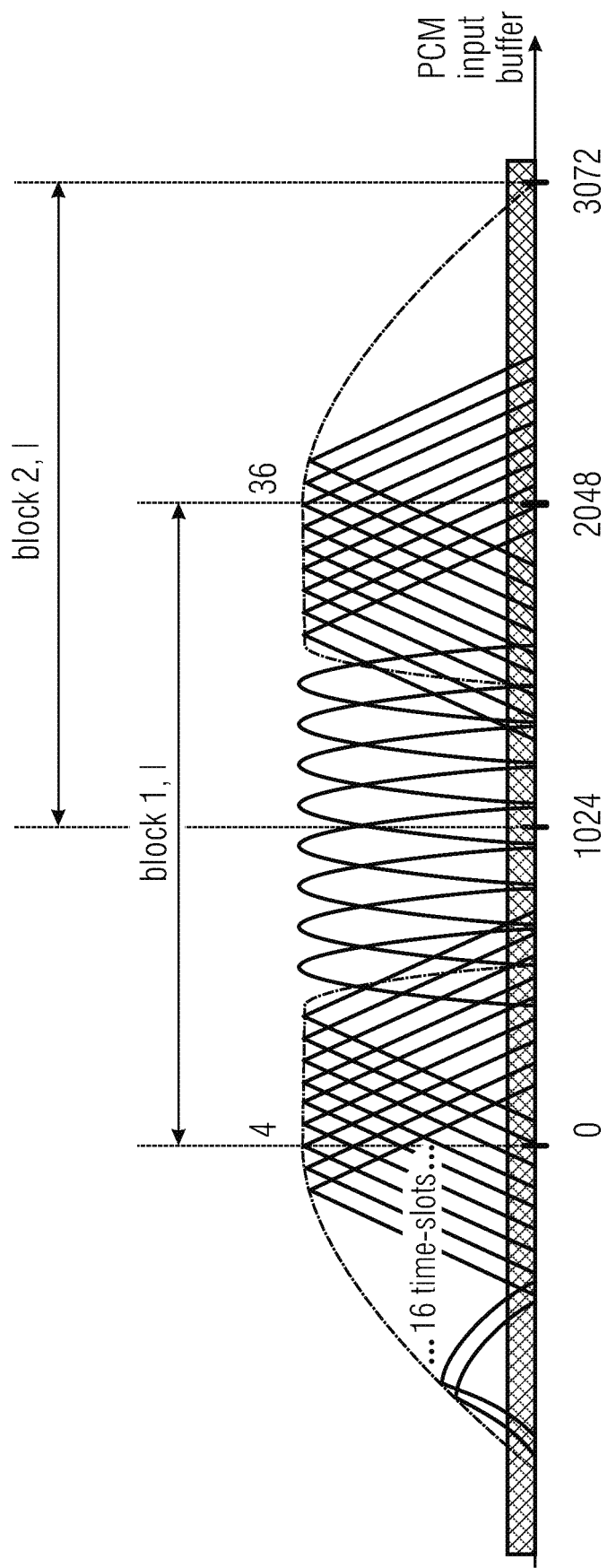
FIG. 6 illustrates a stop-start window sequence.

FIG. 6 shows a stop-start window sequence for illustrating the dependency of the scale factor on the used window sequence. In the shown example, the frame f of the SBR-encoded audio signal contains 32 sub-samples of QMF. The first window type ws(f, 0) of the sequence spans over the complete frame data, i.e. a block of $t_h$ sub-samples. The following window ws(f, 1) overlaps ws(f, 0) while spanning over $t_h/2$ sub-samples of the frame f and $t_h/2$ of the following frame f+1. The frames of SBR grids can be availed as blocks of QMF energy grids with the relation—in this shown embodiment—that one frame generates two blocks of QMF subsamples.

In the following, an IGF Decoder for decoding a SBR-encoded audio signal is explained using one embodiment.

Figure 7:
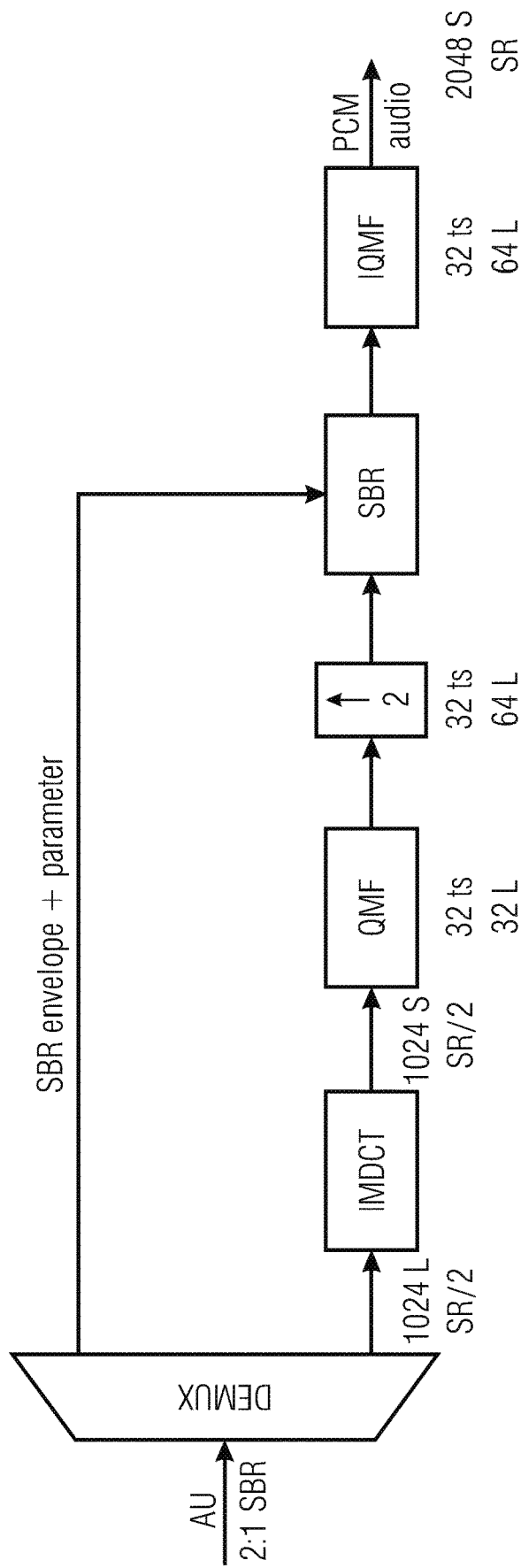
FIG. 7 illustrates a decoder according to the state of art.

A typically 2:1 SBR decoder is e.g. described in M. Neuendorf et al., "The ISO/MPEG Unified Speech and Audio Coding Standard—Consistent High Quality for All Content Types and at All Bit Rates", J. Audio Eng. Soc., vol. 61, no. 12, pp. 956-977, December 2013 and shown in FIG. 7.

Figure 8:
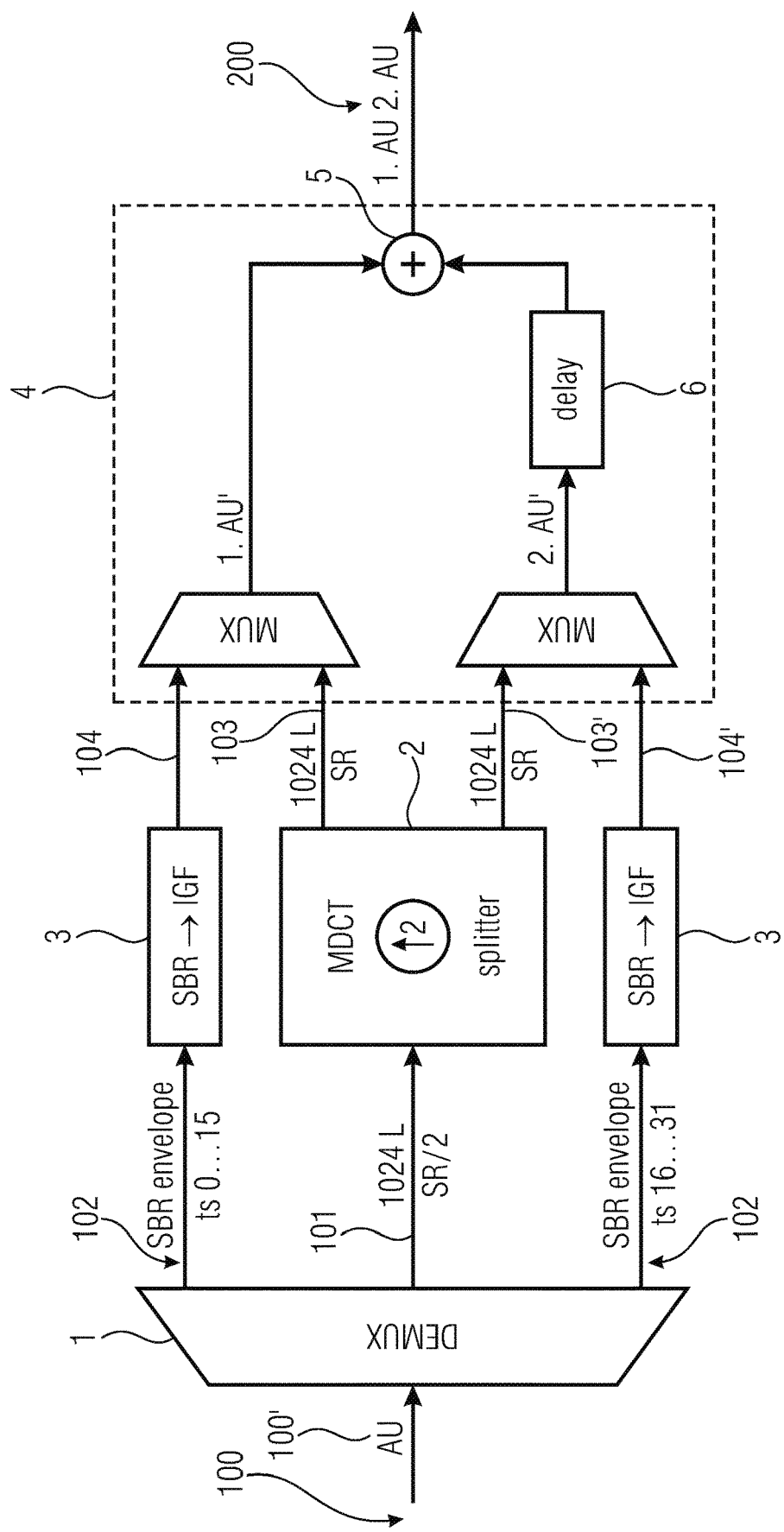
FIG. 8 illustrates an embodiment of an apparatus for transcoding an encoded audio signal as a block diagram.

An embodiment of an inventive transcoder in form of a block diagram is shown in FIG. 8.

The SBR-encoded audio signal 100 comprising access units 100' is fed to a demultiplexer 1 extracting a core signal 101 and a set of parameters 102 allowing to reconstruct the missing parts of the audio signal. The core signal 101 is fed to the upsampler 2 which is here embodied by a MDCT splitter and the set of parameters 102 are fed to the parameter converter which is this depiction is shown as comprising to separate elements.

In this example, the set of parameters 102 especially refer to the spectral envelope provided by the SBR-encoded audio signal. In this example, the time slots 0-15 of a frame of the SBR-encoded audio signal are transmitted to the upper parameter converter element and the time slots 16-31 are transmitted to the lower parameter converter element. The number of time slots still refer to the exemplary parameters used for the discussion of the conversion of the parameters from QMF to MCLT.

In each subsection of the parameter converter 3 at least the parameters referring to the spectral envelope are converted which is done via the above explained conversion of the QMF data to the MCLT data. The resulting converted parameters 104, 104' are suitable for usage of the intelligent gap filling and are fed to the spectral gap filling processor 4 comprising two multiplexers in order to be merged with a corresponding upsampled spectrum 103, 103' derived by the upsampler 2 from the core signal 101.

The result comprises two access units 1. AU' and 2. AU' as output of the multiplexers of the spectral gap filling processor 4. Both access units 1. AU' and 2. AU' are fed to an adder 5, wherein the second access unit 2. AU' is delayed by a delay element 6. The result of the adder 5 is a transcoded audio signal 200 which is especially in the shown embodiment an IGF-encoded audio signal having the two access units 1. AU and 2. AU.

Figure 10:
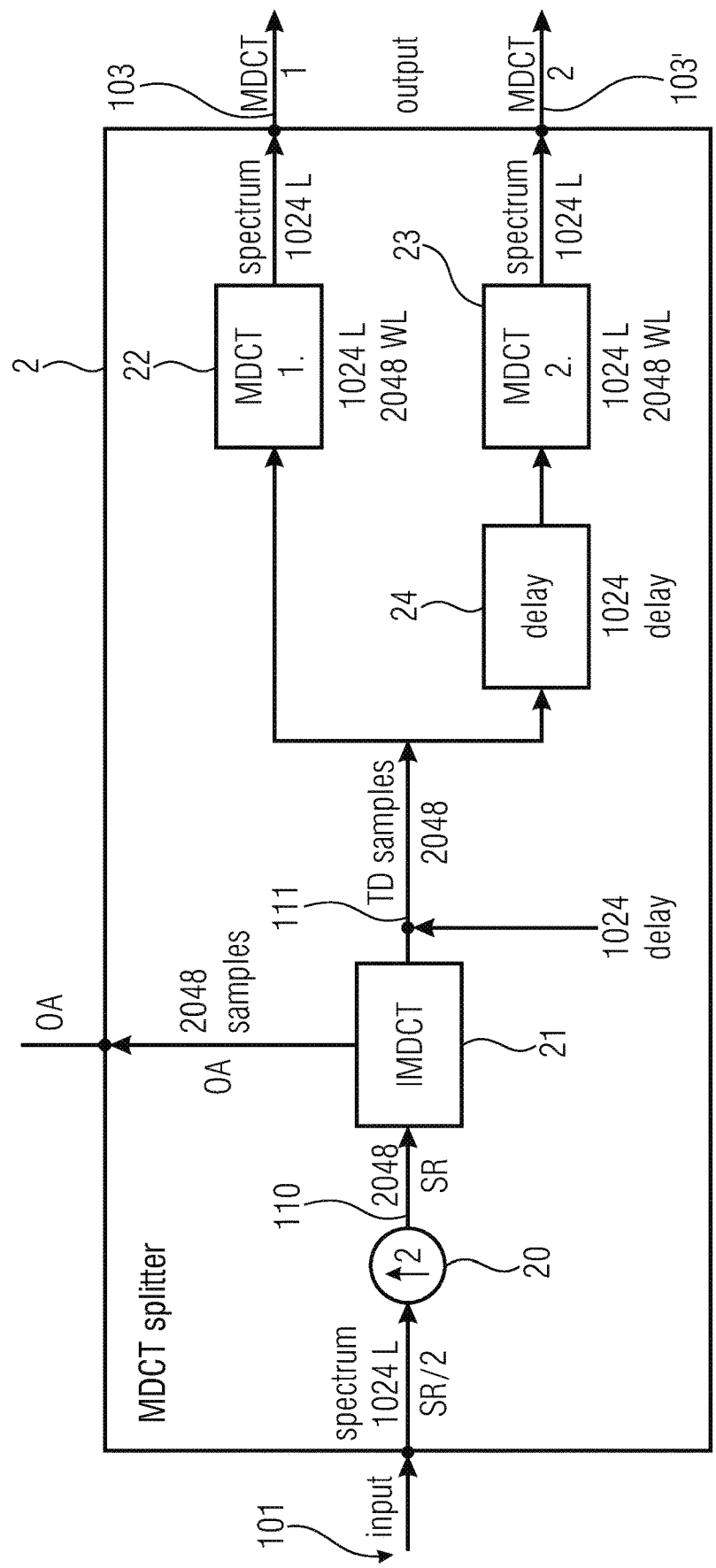
FIG. 10 illustrates an embodiment of an upsampler used e.g. in the embodiments shown in FIG. 8 and FIG. 9, respectively.

The upsampler 2 is explained using the exemplary embodiment depicted in FIG. 10 in which the upsampler 2 is label as MDCT Splitter.

The upsampler 2 comprises an spectrum upsampler 20 for upsampling the spectrum of the core signal 101 (having e.g. 1024 lines) of the original SBR-encoded audio signal. The upsampled spectrum 110 (if the upsampling is done, for example, by the factor 2, the resulting signal has 2048 lines) undergoes an inverse modified discrete cosine transform performed by an IMDCT converter 21 as one example of an inverse transform. The such obtained time domain signal 111 (consisting of time domain samples) undergoes an overlap-add (designed by OA) and is such split in two signals. Both signals have e.g. 1024 lines and the—here such drawn—lower signal is affected by a delay 24 of the overlap-add corresponding to 1024 lines. Both signals then undergo a modified discrete cosine transform performed by two MDCT converters 23 leading to two upsampled spectra 103 as output of the upsampler 2.

Figure 11:
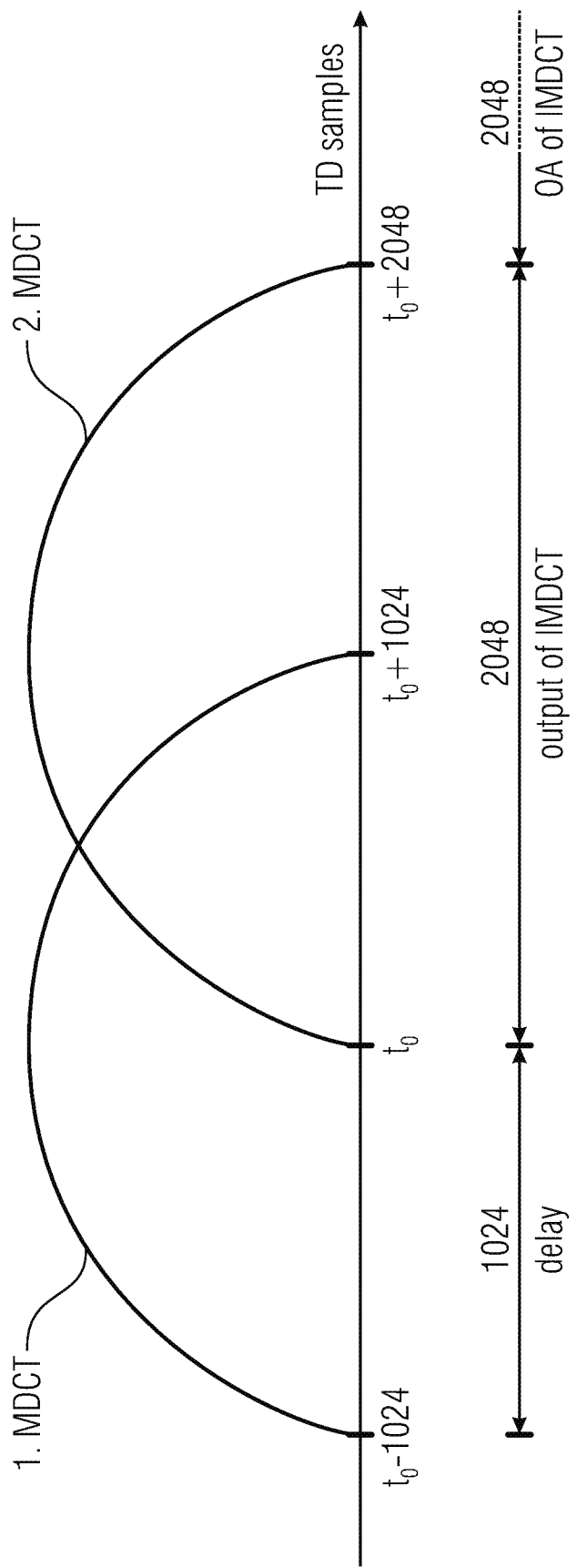
FIG. 11 illustrates the working of the parameter converter of the upsampler shown in FIG. 10.

The effect of the two MDCT converters 23 is shown in FIG. 11. In this picture, 1. MDCT refers to the upper MDCT converter 23 shown in FIGS. 3 and 2. MDCT refers to the lower MDCT converter 23. Output of IMDCT refers to the inverse modified discrete cosine transformed upsampled core signal 111. Further, there is an overlap add OA provided to the IMDCT converter 21 with e.g. 2048 samples.

For details of the MDCT see, e.g., WO 2014/128197 A1, especially pages 14-16.

Alternatively, not a MDCT transform and an IMDCT transform are performed but a Fast Fourier and Inverse Fast Fourier Transform.

Figure 9:
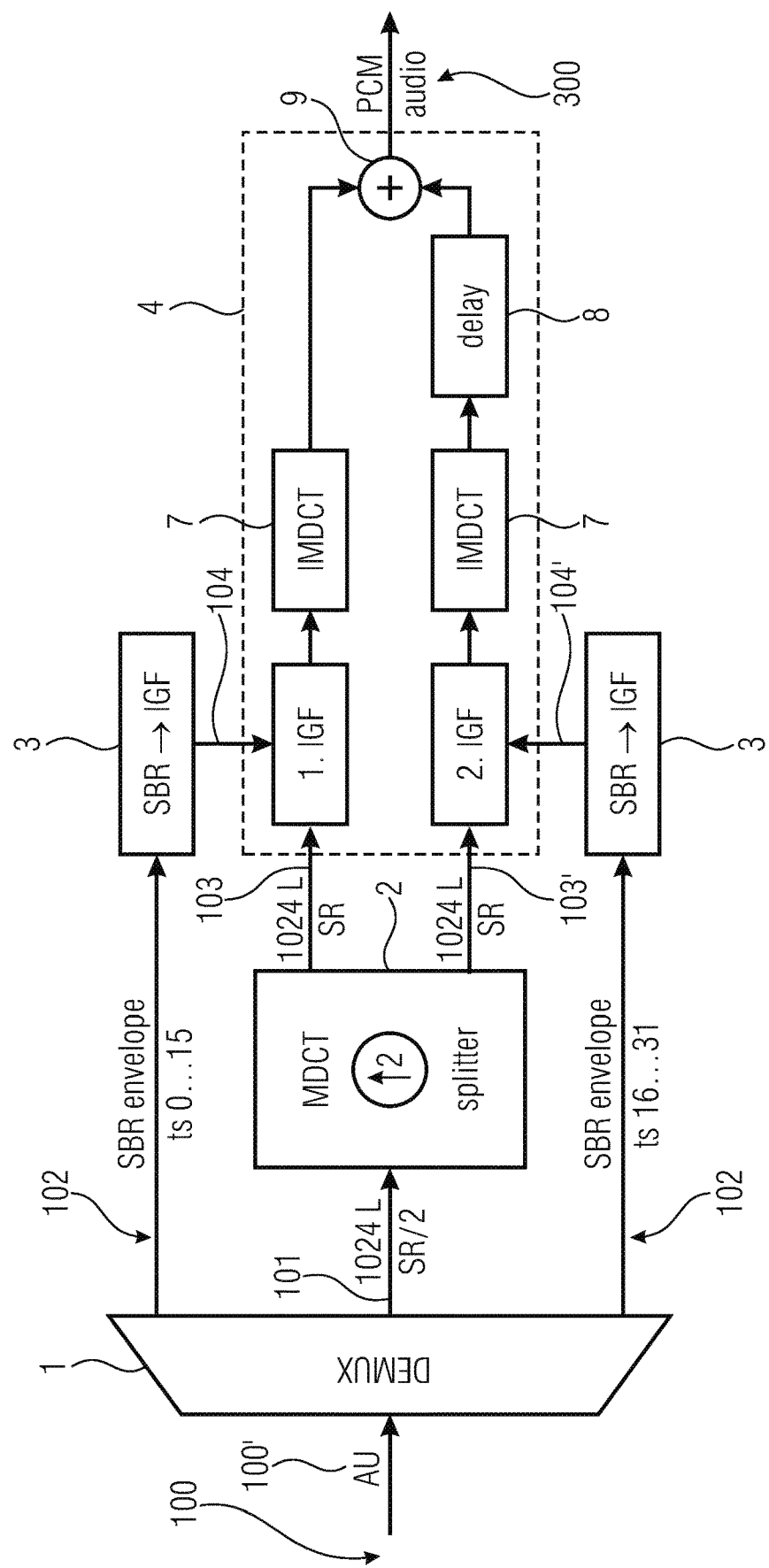
FIG. 9 illustrates an embodiment of an apparatus for decoding an encoded audio signal as a block diagram.

The apparatus shown in FIG. 9 allows to decode a—here SBR (Spectral Band Replication)—encoded audio signal 100 into an audio signal 300 as one example for the processing of such an encoded audio signal 100.

For this purpose, the apparatus comprises a demultiplexer 1, which generates from a access unit 100' of the SBR-encoded audio signal 100 the core signal 101 and a set of parameters 102. The set of parameters 102 describes the spectrum above the core signal, i.e. describes the missing parts.

The core signal 101 is submitted to an upsampler 2, here embodied as a MDCT splitter, for upsampling the core signal 101. This is due to the fact that the core signal of a SBR-encoded audio signal has a reduced sampling rate compared to the core signal of an IGF-encoded audio signal. The details of an embodiment of the upsampler 2 was explained with regard to FIG. 10.

The set of parameters 102 is submitted to a parameter converter 3 which is here embodied by two converter elements or units. The access unit 100' comprises at least a frame covering timely consecutive timeslots. Here, there are 32 timeslots. The parameters of the first timeslots covering timeslots 0 to 15 are fed to the upper parameter converter unit and the parameter of the second timeslot ranging from 16 to 31 are fed to the lower parameter converter unit to be converted. The parameters of the encoded audio-signal and the converted parameter refer to different filter banks, e.g. Quadrature Mirror Filter (QMF) and Modulated Complex Lapped Transform (MCLT), respectively. Therefore, the parameter converter unit insert a delay compensation into the parameters of the SBR-encoded audio signal for synchronization. Further, the parameter converter unit map a time-frequency grid which is underlying the time slots of the SBR-encoded audio signal using a windowing performed—advantageously beforehand—on the parameter using a window applied to time signals using filter banks of Modulated Complex Lapped Transform.

The resulting converted parameters 104, 104' are fed to the two components (1. IGF and 2. IGF) of the spectral gap filling processor 4 for merging the upsampled spectra 103, 103' with the corresponding converted parameters 104, 104'. Corresponding implies in the depicted embodiement, that the converted parameters 104 derived from the first set of timeslots are merged with the upsampled spectrum provided by "MDCT 1." shown in FIG. 10 and that the converted parameters 104' derived from the second set of timeslots are merged with the delayed upsampled spectrum provided by "MDCT 2.".

The results of these mergers are transformed by two IMDCT converters 7 using an inverse modified discrete cosine transform into time signals and are overlap-added (delay 8 and adder 9) to the desired audio signal 300.

Figure 12:
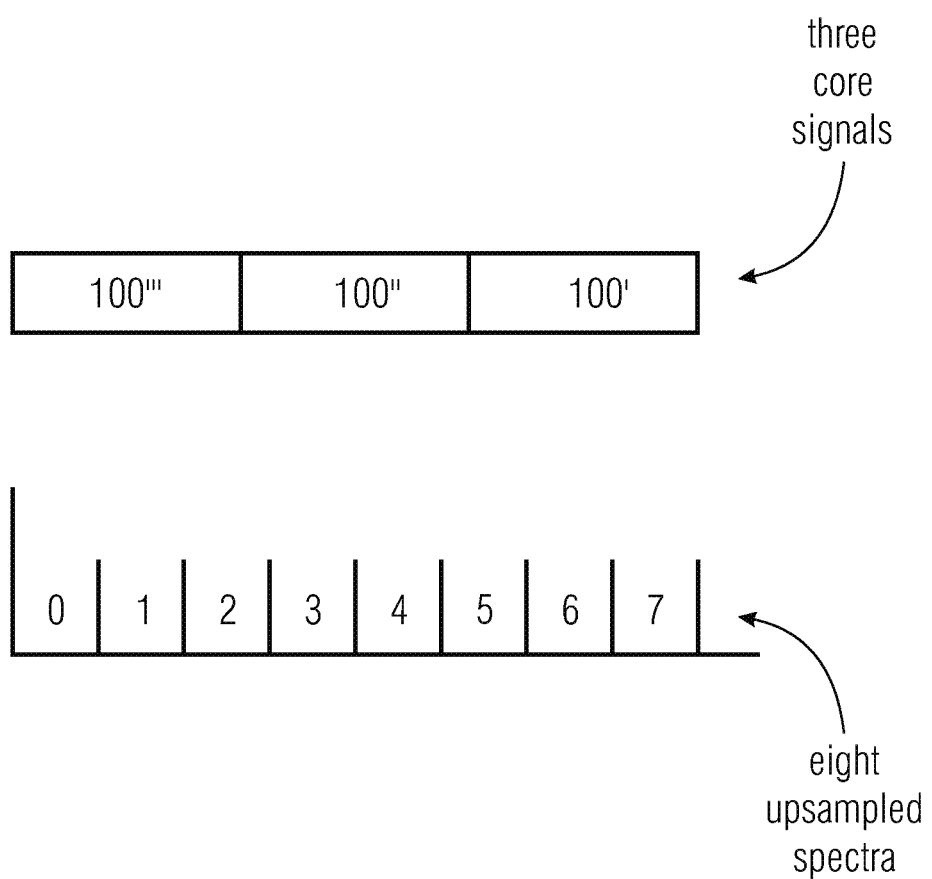
FIG. 12 illustrates an upsamling of core signals with a 3:8 ratio.

FIG. 12 shows an example for upsampling core signals with a 3:8 ratio. In this case, the upsampler stores the core signals of three timely consecutive access units 100' (this is the above discussed and hence "current" access unit), and the two forgoing access units 100" and 100'''. These three core signals are added and afterwards divided in eight upsampled spectra.

In the—not shown—case that upsampling of the core signals is done with a 3:4 ratio, the upsampler also stores the core signals of three timely consecutive access units. These core signals are also added but are divided in four upsampled spectra.

Similar, two core signals from two access units are needed for one upsampled spectrum if a certain overlap is desired.

Figure 13:
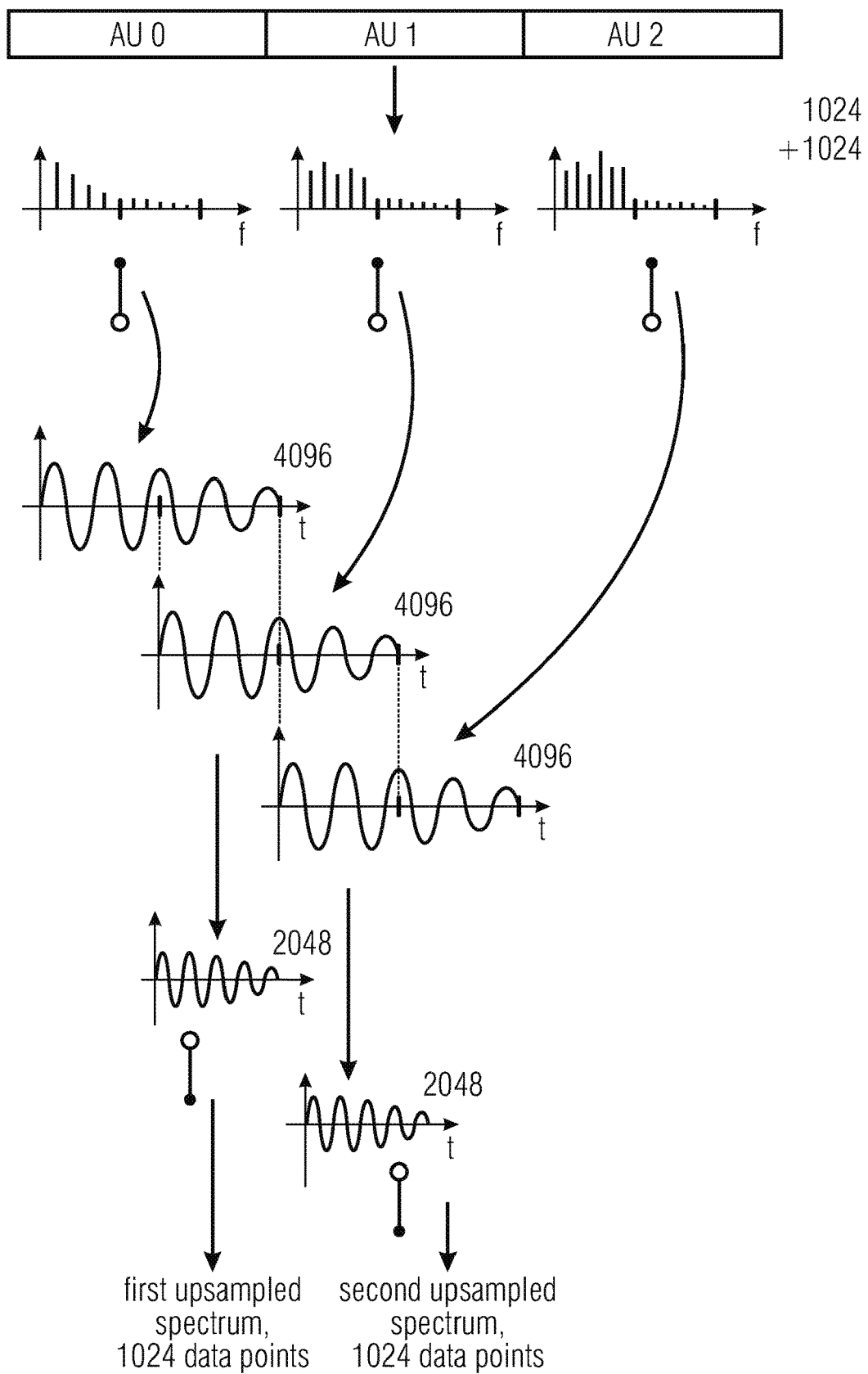
FIG. 13 illustrates an overlap-add sequence applied to access units.

FIG. 13 illustrates schematically the overlap-add. The explanation follows the rows from top to bottom.

Given are three access units: AU 0, AU 1, and AU 2, each having a core signal with 1024 data points. The corresponding spectra of the core signals are added up by zeros following the spectra of the core signals. The upfilled spectra having 2048 data points. These spectra are transformed into the time domain with signals having 2*2048=4096 data points.

For these time signals, overlapping parts of the signals are added up, the overlap referring to a first half of one and a second half of another time signal.

The resulting sum time signals have 2048 data as from each of the foregoing time signals just a half is used.

Hence, from the three access units AU 0, AU 1, and AU 2, three time signals are obtained. From the time signal stemming from AU 0 the second half is added with the first half of the time signal obtained from AU 1. The second half of the time signal derived from AU 1 is added with the first half of the time signal obtained from AU 2. Due to this, three access units provide in this example of an overlap of 50% two overlap-added time signals, both having 2048 data points.

These two overlap-added time signals are afterwards transformed into the frequency domain (using e.g. Fast Fourier Transformation or any other suitable transform), yielding the first and second upsampled spectrum, both having 1024 data points.

Figure 14:
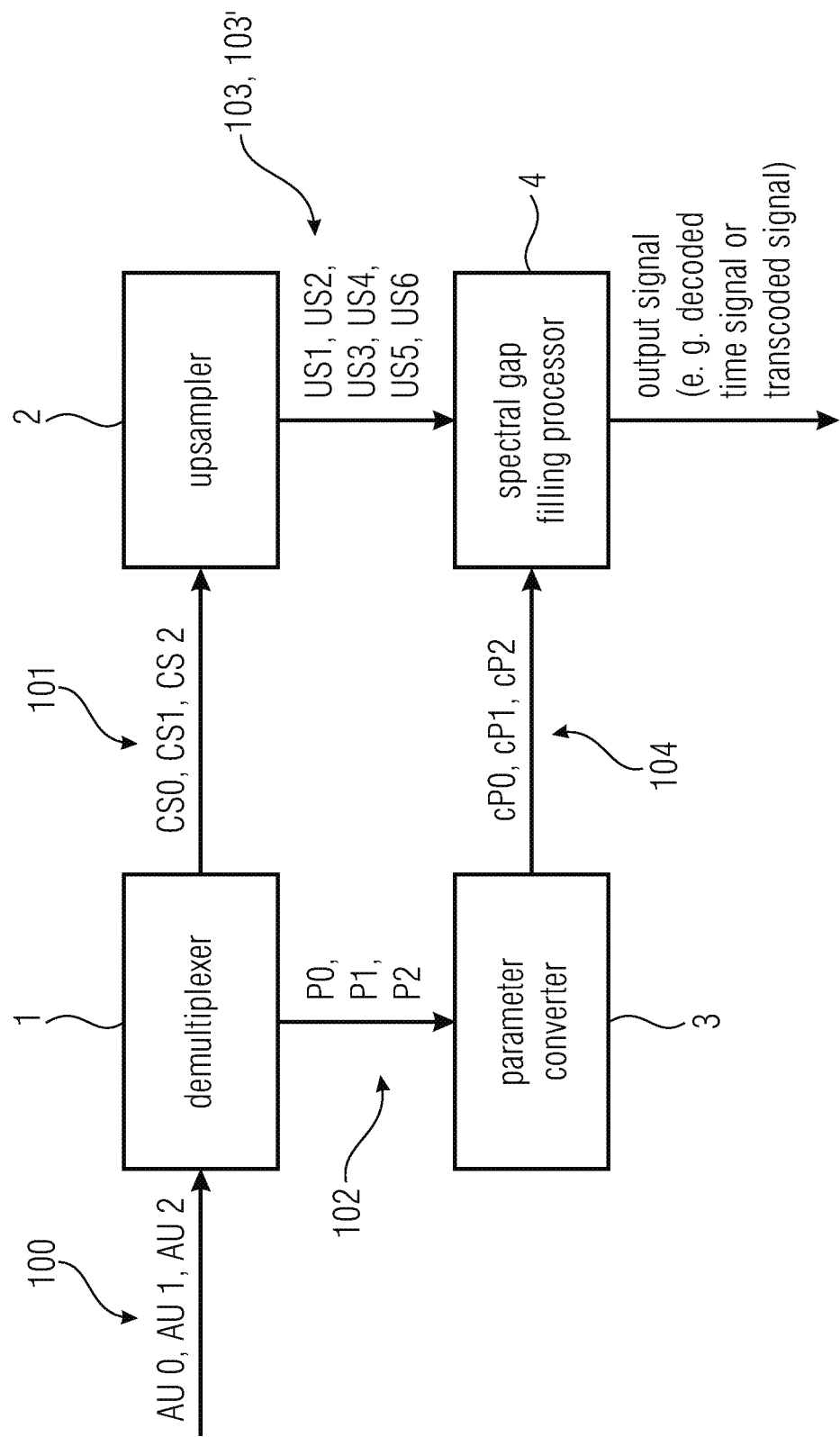
FIG. 14 illustrates the inventive apparatus as a block diagram.

In FIG. 14 the inventive apparatus is shown once more.

In this depicted embodiment, the encoded audio signal 100 contains access units from which three are shown: AU 0, AU 1, and AU 2. These access units are fed to the demultiplexer 1 which extracts the respective core signals CS0, CS1, and CS 2 and the respective parameters for describing the missing parts of the audio signal P0, P1, and P2.

The core signals CS0, CS1, and CS2 are submitted to the upsampler 2 which upsamples the core signals and produces for each core signal to upsampled spectra US1, US2 for CS0, US3, US4 for CS1, and US5, US6 for CS2.

The parameter on the other hand are fed to the parameter converter 3 yielding converted parameters cP0, cP1, and cP2.

The spectral gap filling processor 4 processes the upsampled spectra US1, US2, US3, US4, US5, and US6 using the corresponding converted parameters cP0, cP1, and cP2.

For example, the first upsampled spectrum US1 of the first access unit AU 0 is processed with a first sub-set of the converted parameters cP0 and the second upsampled spectrum US2 of the first access unit AU 0 is processed with a second sub-set of the converted parameters cP0. The output of the spectral gap filling processor 4 is, e.g., an audio signal or a transcoded audio signal.

Figure 15:
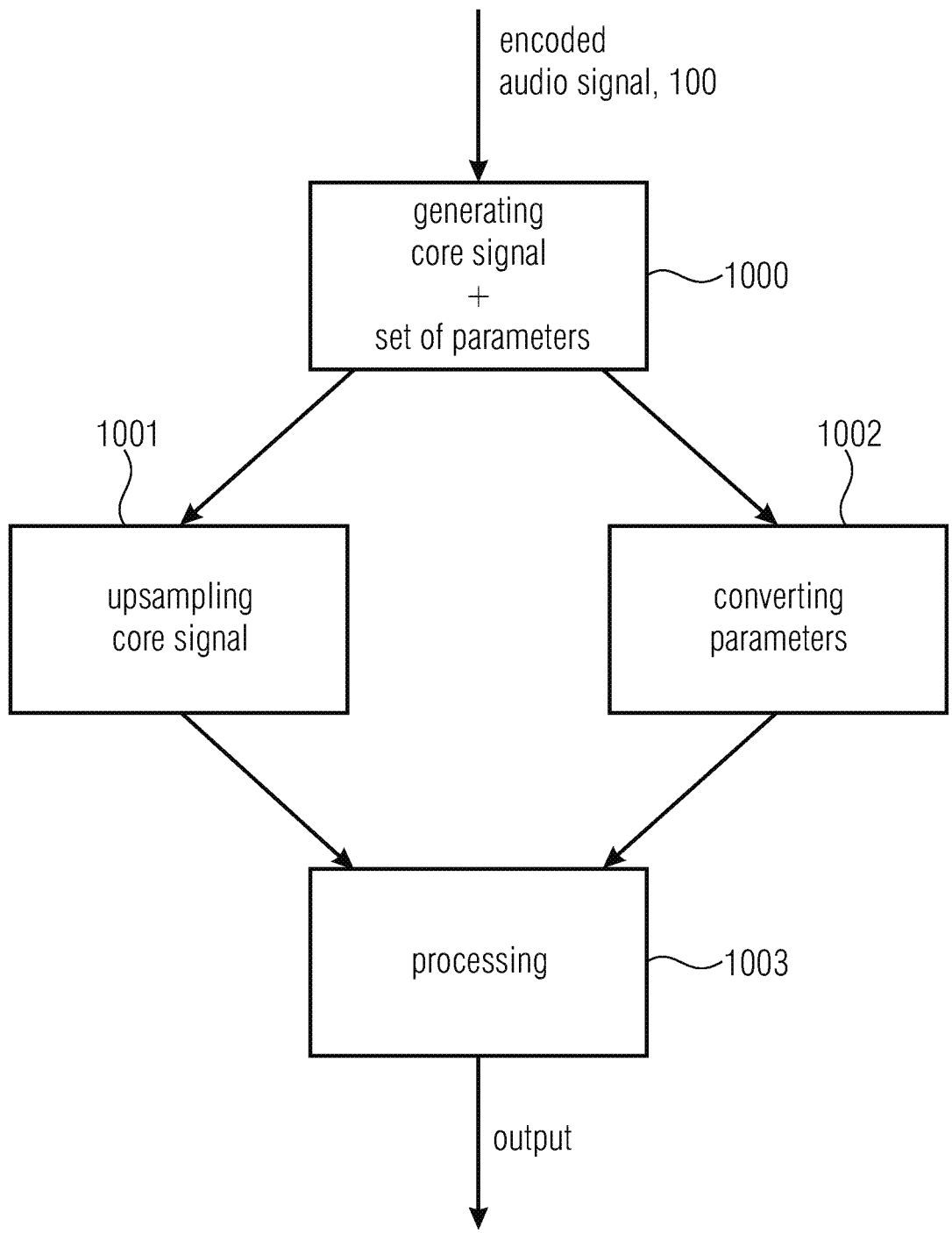
FIG. 15 illustrates the inventive method using a flow chart.

FIG. 15 shows the main steps of the inventive method for processing the encoded audio signal 100.

In a step 1000 from the encoded audio signal 100—or to be more precise: from one access unit of the encoded audio signal 100 the core signal and a set of parameters are generated or extracted.

The following steps can be performed in a arbitrarily given sequence or in parallel.

The core signal is upsampled in step 1001 which yields especially two timely consecutive upsampled spectra. The parameters are converted in step 1002 into converted parameters being applicable to the upsampled spectra.

Finally, the upsampled spectra and the converted parameter—additionally also other parameters obtained from the access unit of the encoded audio signal—are processed in step 1003. The output of this processing is, e.g. an audio signal as a time signal or a differently encoded and, thus, transcoded audio signal.

Usually, the encoded audio signal also contains further parameters for describing the original audio signal and for reconstructing the missing parts during the decoding of the encoded audio signal.

The inventive processing technique helps e.g. in the conversion of SBR side information to IGF for envelope shaping during high frequency (HF) synthesis. Additional control parameters indicate HF spectrum where the noise to tonality ratio, in spite of envelope shaping, does not match the input signal. This nature in audio is observed in signals like woodwind music instruments, or in rooms with reverberation. The higher frequencies in these cases are not harmonic or highly tonal and can be perceived as noisy in comparison to lower frequencies.

The formants in the signal are estimated using an inverse prediction error filter at the Encoder. A level of inverse filtering is decided according to match the input signal features. This level is signaled by SBR. As the envelope shaping in the HF spectrum does not help to reduce the tonality of the spectrum completely, a pre-whitening filter with different levels of frequency dependent chirp factor can be applied to the linear prediction error filter for flattening of formants.

These anomalous signal characteristics are addressed by SBR using an Inverse Filtering Tool while IGF uses a Whitening Tool. The degree of pre-whitening is mapped to separate levels in the technologies.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Also, aspects of the apparatus for transcoding a SBR-encoded audio signal may be valid for the apparatus for decoding a SBR-encoded audio signal and vice versa. The same holds for the corresponding methods.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for processing an encoded audio signal, the encoded audio signal comprising a sequence of audio access units, each audio access unit of the sequence of audio access units comprising a core audio signal and parameters associated with the core audio signal, the apparatus comprising:
 a demultiplexer configured for extracting, from an audio access unit of the sequence of audio access units of the encoded audio signal, the core audio signal having an audio content limited to a first spectral width having a maximum frequency, and the parameters describing an audio content of a missing spectrum having frequencies, with respect to frequency, above the maximum frequency of the first spectral width;
 an upsampler configured for upsampling the core audio signal of the audio access unit to obtain a first upsampled spectrum and a timely consecutive second upsampled spectrum for the audio access unit, wherein the upsampling is performed by the upsampler
  such that each upsampled spectrum of the first upsampled spectrum and the second upsampled spectrum comprises an audio content being identical to the audio content of the core audio signal, and
  such that each upsampled spectrum of the first upsampled spectrum and the second upsampled spectrum comprises a second spectral width, the second spectral width being greater than the first spectral width of the core audio signal, and the second spectral width having frequencies being higher than the maximum frequency of the first spectral width;
 a parameter converter configured for converting the parameters of the audio access unit to acquire converted parameters of the audio access unit, the converted parameters being applicable to the first upsampled spectrum and the second upsampled spectrum; and
 a spectral gap filling processor configured for processing the first upsampled spectrum of the audio access unit and the second upsampled spectrum of the audio access unit using the converted parameters of the audio access unit.

2. The apparatus of claim 1, wherein the parameters are energy values of the spectrum having frequencies, with respect to frequency, above the maximum frequency of the first spectral width, and wherein the parameter converter is configured to convert the energy values into spectral gap filling energy values usable by the spectral gap filling processor by scaling the energy values with a given scale factor to obtain the spectral gap filling energy values.

3. The apparatus of claim 2,
 wherein the parameter converter is configured for extracting an information about a window function associated with the audio access unit, and
 wherein the parameter converter is configured to adapt the given scale factor according to the window function associated with the audio access unit to obtain an adapted scale factor and to scale the energy values with the adapted scale factor to obtain the spectral gap filling energy values.

4. The apparatus of claim 1, wherein the upsampler is configured
 to fill up, for a preceding audio access unit, the spectrum having frequencies, with respect to frequency, above the maximum frequency of the first spectral width of the core audio signal with zeroes to obtain a filled-up spectrum of the preceding audio access unit in the sequence of audio access units,
 to fill up, for the audio access unit, the spectrum having frequencies, with respect to frequency, above the maximum frequency of the first spectral width of the core audio signal with zeroes to obtain a filled-up spectrum of the audio access unit in the sequence of audio access units,
 to perform a spectrum to time transform of the filled up spectrum of the audio access unit to obtain a time domain signal for the filled up spectrum of the audio access unit and to perform a spectrum to time transform of the filled up spectrum of the preceding audio access unit to obtain a time domain signal for the filled up spectrum of the preceding audio access unit, and
 to perform an overlap-add of the time domain signal for the filled up spectrum of the preceding audio access unit and of the time domain signal for the filled up spectrum of the audio access unit, to acquire an intermediate time signal.

5. The apparatus of claim 4,
wherein the upsampler is configured
to perform a time to spectrum transform with a first portion of the intermediate time signal to acquire the first upsampled spectrum, and
to perform a time to spectrum transform with a second portion of the intermediate time signal to acquire the second upsampled spectrum, and
wherein the first portion overlaps with the second portion.

6. The apparatus of claim 1,
wherein the upsampler is configured
for upsampling the core audio signal in order to acquire an upsampled core audio signal,
for performing a spectrum to time transform on the upsampled core audio signal in order to acquire a time domain signal,
for processing the time domain signal to acquire the first upsampled spectrum and the timely consecutive second upsampled spectrum by applying a time to spectrum transform, and
wherein the spectrum to time transform is an inverse transform of the time to spectrum transform.

7. The apparatus of claim 6, wherein the spectrum to time transform is an inverse modified discrete cosine transform and wherein the time to spectrum transform is a modified discrete cosine transform.

8. The apparatus of claim 1, wherein the spectral gap filling processor is configured to decode the first upsampled spectrum and the second upsampled spectrum with the converted parameters to acquire a time domain output signal.

9. The apparatus of claim 8, wherein the spectral gap filling processor is configured, in a processing comprising a decoding, to apply a first part of the converted parameters to the first upsampled spectrum to acquire a first processed spectrum and to apply a second part of the converted parameters to the second upsampled spectrum to acquire a second processed spectrum.

10. The apparatus of claim 1, wherein said spectral gap filling processor is configured to generate, as a transcoded audio signal, an output data stream representing a spectral gap filling coded signal having a first transcoded audio access unit and a second transcoded audio access unit, the first transcoded audio access unit comprising a transformed version of the first upsampled spectrum and a first part of the converted parameters and the second transcoded audio access unit comprising a transformed version of the second upsampled spectrum and a second part of the converted parameters.

11. The apparatus of claim 10, wherein said spectral gap filling processor is configured for delaying the second transcoded audio access unit to obtain a delayed second audio access unit and for adding the first transcoded audio access unit and the delayed second audio access unit to obtain the transcoded audio signal.

12. The apparatus of claim 1, wherein the upsampler is configured, when generating the first upsampled spectrum and the second upsampled spectrum, to fill the spectrum having frequencies, with respect to frequency, above the maximum frequency of the first spectral width of the core audio signal with zeroes to obtain a filled-up spectrum and to derive the first upsampled spectrum and the second upsampled spectrum from the filled-up spectrum.

13. The apparatus of claim 1, wherein the upsampler is configured for upsampling the core audio signal of the audio access unit of the sequence of audio access units additionally using a further core audio signal of an audio access unit directly preceding the audio access unit in the sequence of audio access units.

14. The apparatus of claim 1, wherein the upsampler is configured for collecting core audio signals of a first number of timely consecutive audio access units and processing, from the core audio signals of the first number of timely consecutive audio access units, a second number of upsampled spectra for a non-integer upsampling ratio, wherein the first number is a denominator of the non-integer upsampling ratio and the second number is a nominator of the non-integer upsampling ratio.

15. The apparatus of claim 1,
wherein the parameter converter is configured for converting a first subset of parameters of the parameters referring to a first part of timely consecutive timeslots to obtain a first converted subset of parameters and for converting a second subset of the parameters referring to a second part of the timeslots timely consecutive to the first part of timeslots to obtain a second converted subset of parameters, and
wherein the spectral gap filling processor is configured to process the first converted subset of parameters with the first upsampled spectrum and to process the second converted subset of parameters with the second upsampled spectrum.

16. The apparatus of claim 1, wherein the parameter converter is configured for shifting the parameters by inserting a delay compensation.

17. The apparatus of claim 1, wherein the upsampler is configured for upsampling the core audio signal of the audio access unit by interpolating values of the core audio signal.

18. The apparatus of claim 1, wherein the spectral gap filling processor is configured to decode the first upsampled spectrum using a first portion of the converted parameters to obtain a first processed spectrum and to decode the second upsampled spectrum with a second portion of the converted parameters to obtain a second processed spectrum,
wherein the spectral gap filling processor comprises:
a spectrum to time converter configured for converting the first processed spectrum into a time domain to obtain a first time domain signal and for converting the second processed spectrum into the time domain to obtain a second time domain signal, and
an overlap-adder configured for overlap-adding at least the first time domain signal and the second two output time domain signal in order to obtain a time domain output signal.

19. The apparatus of claim 1, wherein the spectral gap filling processor is configured for generating, when performing a transcoding operation, a spectral gap filling coded signal comprising a first audio access unit and a second audio access unit, the first audio access unit comprising a transformed version of the first upsampled spectrum and a first part of the converted parameters and the second audio access unit comprising a transformed version of the second upsampled spectrum and a second part of the converted parameters.

20. The apparatus of claim 1, wherein said encoded audio signal is an SBR-encoded (SBR=Spectral Band Replication) audio signal, wherein said parameter converter is configured for converting parameters referring to energy values of the parameters into energy values usable by the spectral gap filling processor by scaling the parameters referring to the energy values with a given scale factor.

21. The apparatus of claim 1, wherein said spectral gap filling processor is configured to decode the first upsampled spectrum and the second upsampled spectrum with the converted parameters to obtain a time domain output signal.

22. A method for processing an encoded audio signal, the encoded audio signal comprising a sequence of audio access units, each audio access unit of the sequence of audio access units comprising a core audio signal and parameters associated with the core audio signal, the method comprising:

extracting, from an audio access unit of the sequence of audio access units of the encoded audio signal, the core audio signal having an audio content limited to a first spectral width having a maximum frequency, and the parameters describing an audio content of a missing spectrum having frequencies, with respect to frequency, above the maximum frequency of the first spectral width;

upsampling the core audio signal of the audio access unit to obtain a first upsampled spectrum and a timely consecutive second upsampled spectrum for the audio access unit, wherein the upsampling is performed such that each upsampled spectrum of the first upsampled spectrum and the second upsampled spectrum comprises an audio content being identical to the audio content of the core audio signal, and such that each upsampled spectrum of the first upsampled spectrum and the second upsampled spectrum comprises a second spectral width, the second spectral width being greater than the first spectral width of the core audio signal, and the second spectral width having frequencies being higher than the maximum frequency of the first spectral width;

converting the parameters of the audio access unit to acquire converted parameters of the audio access unit, the converted parameters being applicable to the first upsampled spectrum and the second upsampled spectrum; and spectral gap filling processing the first upsampled spectrum of the audio access unit and the second upsampled spectrum of the audio access unit using the converted parameters of the audio access unit.

23. Non-transitory storage medium having stored thereon a computer readable code for performing, when running on a computer or a processor, a method for processing an encoded audio signal, the encoded audio signal comprising a sequence of audio access units, each audio access unit of the sequence of audio access units comprising a core audio signal and parameters associated with the core audio signal, the method comprising:

extracting, from an audio access unit of the sequence of audio access units of the encoded audio signal, the core audio signal having an audio content limited to a first spectral width having a maximum frequency, and the parameters describing an audio content of a missing spectrum having frequencies, with respect to frequency, above the maximum frequency of the first spectral width;

upsampling the core audio signal of the audio access unit to obtain a first upsampled spectrum and a timely consecutive second upsampled spectrum for the audio access unit, wherein the upsampling is performed such that each upsampled spectrum of the first upsampled spectrum and the second upsampled spectrum comprises an audio content being identical to the audio content of the core audio signal, and such that each upsampled spectrum of the first upsampled spectrum and the second upsampled spectrum comprises a second spectral width, the second spectral width being greater than the first spectral width of the core audio signal, and the second spectral width having frequencies being higher than the maximum frequency of the first spectral width;

converting the parameters of the audio access unit to acquire converted parameters of the audio access unit, the converted parameters being applicable to the first upsampled spectrum and the second upsampled spectrum; and processing the first upsampled spectrum of the audio access unit and the second upsampled spectrum of the audio access unit using the converted parameters of the audio access unit.

24. A method for processing an encoded audio signal, the encoded audio signal comprising a sequence of access units, each access unit of the sequence of access units comprising a core audio signal with a first spectral width and parameters describing a spectrum above the first spectral width, the method comprising:

generating, from an access unit of the encoded audio signal, the core audio signal and the parameters, wherein the parameters are spectral envelope parameters comprising spectral envelope parameters for a first half of time slots of the access unit and spectral envelope parameters for a second half of time slots of the access unit;

upsampling the core audio signal of the access unit to obtain a first upsampled spectrum and a timely consecutive second upsampled spectrum, the first upsampled spectrum and the second upsampled spectrum, both, comprising a same content as the core audio signal and comprising a second spectral width being greater than the first spectral width of the core audio signal;

converting spectral envelope parameters for the first half of time slots of the access unit into a first part of corresponding gap filling energy parameters and converting the spectral envelope parameters for the second half of time slots of the access unit into a second part of corresponding gap filling energy parameters; and spectral gap filling processing the first upsampled spectrum and the second upsampled spectrum using the first part of the corresponding gap filling energy parameters and using the second part of the corresponding gap filling energy parameters.

25. Non-transitory storage medium having stored thereon a computer readable code for performing, when running on a computer or a processor, a method for processing an encoded audio signal, the encoded audio signal comprising a sequence of access units, each access unit of the sequence of access units comprising a core audio signal with a first spectral width and parameters describing a spectrum above the first spectral width, the method comprising:

generating, from an access unit of the encoded audio signal, the core audio signal and the parameters, wherein the parameters are spectral envelope parameters comprising spectral envelope parameters for a first half of time slots of the access unit and spectral envelope parameters for a second half of time slots of the access unit;

upsampling the core audio signal of the access unit to obtain a first upsampled spectrum and a timely consecutive second upsampled spectrum, the first upsampled spectrum and the second upsampled spectrum, both, comprising a same content as the core audio signal and comprising a second spectral width being greater than the first spectral width of the core audio signal;

converting spectral envelope parameters for the first half of time slots of the access unit into a first part of corresponding gap filling energy parameters and converting the spectral envelope parameters for the second half of time slots of the access unit into a second part of corresponding gap filling energy parameters; and spectral gap filling processing the first upsampled spectrum and the second upsampled spectrum using the first part of the corresponding gap filling energy parameters and using the second part of the corresponding gap filling energy parameters.

26. A method for processing an encoded audio signal, the encoded audio signal comprising a sequence of access units, each access unit of the sequence of access units comprising a core audio signal with a first spectral width and parameters describing a spectrum above the first spectral width, the method comprising:

generating, from an access unit of the encoded audio signal, the core audio signal and a set of the parameters;

upsampling the core audio signal of the access unit to obtain a first upsampled spectrum and a timely consecutive second upsampled spectrum, the first upsampled spectrum and the second upsampled spectrum, both, comprising a same content as the core audio signal and comprising a second spectral width being greater than the first spectral width of the core audio signal;

converting the parameters of the access unit to acquire converted parameters being applicable to the first upsampled spectrum and the second upsampled spectrum; and spectral gap filling processing comprising when generating a transcoded audio signal, multiplexing the first upsampled spectrum and a first part of corresponding gap filling energy parameters to obtain a first transcoded access unit and multiplexing the second upsampled spectrum and a second part of corresponding gap filling energy parameters to obtain a second transcoded access unit, or when decoding the encoded audio signal, applying a first part of the converted parameters to the first upsampled spectrum using a gap filling operation to obtain a first processed spectrum and applying a second part of the converted parameters to the second upsampled spectrum using a gap filling operation to obtain a second processed spectrum, performing an IMDCT operation on the first processed spectrum to obtain a first time signal, performing an IMDCT operation on the second processed spectrum to obtain a second time signal, and overlapping and adding the first time signal and the second time signal to obtain a time domain output signal.

27. Non-transitory storage medium having stored thereon a computer readable code for performing, when running on a computer or a processor, a method for processing an encoded audio signal, the encoded audio signal comprising a sequence of access units, each access unit of the sequence of access units comprising a core audio signal with a first spectral width and parameters describing a spectrum above the first spectral width, the method comprising:

generating, from an access unit of the encoded audio signal, the core audio signal and a set of the parameters;

upsampling the core audio signal of the access unit to obtain a first upsampled spectrum and a timely consecutive second upsampled spectrum, the first upsampled spectrum and the second upsampled spectrum, both, comprising a same content as the core audio signal and comprising a second spectral width being greater than the first spectral width of the core audio signal;

converting the parameters of the access unit to acquire converted parameters being applicable to the first upsampled spectrum and the second upsampled spectrum; and spectral gap filling processing comprising when generating a transcoded audio signal, multiplexing the first upsampled spectrum and a first part of corresponding gap filling energy parameters to obtain a first transcoded access unit and multiplexing the second upsampled spectrum and a second part of corresponding gap filling energy parameters to obtain a second transcoded access unit, or when decoding the encoded audio signal, applying a first part of the converted parameters to the first upsampled spectrum using a gap filling operation to obtain a first processed spectrum and applying a second part of the converted parameters to the second upsampled spectrum using a gap filling operation to obtain a second processed spectrum, performing an IMDCT operation on the first processed spectrum to obtain a first time signal, performing an IMDCT operation on the second processed spectrum to obtain a second time signal, and overlapping and adding the first time signal and the second time signal to obtain a time domain output signal.

28. An apparatus for processing an encoded audio signal, the encoded audio signal comprising a sequence of access units, each access unit of the sequence of access units comprising a core audio signal with a first spectral width and parameters describing a spectrum above the first spectral width, the apparatus comprising:

a demultiplexer configured for generating, from an access unit of the sequence of access units of the encoded audio signal, the core audio signal and the parameters, wherein the parameters are spectral envelope parameters comprising spectral envelope parameters for a first half of time slots of the access unit and spectral envelope parameters for a second half of time slots of the access unit;

an upsampler configured for upsampling the core audio signal of the access unit to obtain a first upsampled spectrum and a timely consecutive second upsampled spectrum, the first upsampled spectrum and the second upsampled spectrum, both, comprising a same content as the core audio signal and comprising a second spectral width being greater than the first spectral width of the core audio signal;

a first portion of a parameter converter configured for converting the spectral envelope parameters for the first half of time slots of the access unit into a first part of corresponding gap filling energy parameters and a second portion of the parameter converter configured for converting the spectral envelope parameters for the second half of time slots of the access unit into a second part of corresponding gap filling energy parameters; and a spectral gap filling processor configured for processing the first upsampled spectrum and the second upsampled spectrum using the first part of the corresponding gap filling energy parameters and using the second part of the corresponding gap filling energy parameters.

29. An apparatus for processing an encoded audio signal, the encoded audio signal comprising a sequence of access units, each access unit of the sequence of access units comprising a core audio signal with a first spectral width and parameters describing a spectrum above the first spectral width, the apparatus comprising:
- a demultiplexer configured for generating, from an access unit of the encoded audio signal, the core audio signal and the parameters;
- an upsampler configured for upsampling the core audio signal of the access unit to obtain a first upsampled spectrum and a timely consecutive second upsampled spectrum, the first upsampled spectrum and the second upsampled spectrum, both, comprising a same content as the core audio signal and comprising a second spectral width being greater than the first spectral width of the core audio signal;
- a parameter converter configured for converting the parameters of the access unit to acquire converted parameters being applicable to the first upsampled spectrum and the second upsampled spectrum; and
- a spectral gap filling processor configured,
  when generating a transcoded audio signal, to multiplex the first upsampled spectrum and a first part of corresponding gap filling energy parameters to obtain a first transcoded access unit and to multiplex the second upsampled spectrum and a second part of corresponding gap filling energy parameters to obtain a second transcoded access unit, or
  when decoding the encoded audio signal, to apply a first part of the converted parameters to the first upsampled spectrum using a gap filling operation to obtain a first processed spectrum and to apply a second part of the converted parameters to the second upsampled spectrum using a gap filling operation to obtain a second processed spectrum, to perform an IMDCT operation on the first processed spectrum to obtain a first time signal, to perform an IMDCT operation on the second processed spectrum to obtain a second time signal, and to overlap and add the first time signal and the second time signal to obtain a time domain output signal.

\* \* \* \* \*